(12) United States Patent
Gong et al.

(10) Patent No.: US 6,665,197 B2
(45) Date of Patent: Dec. 16, 2003

(54) CIRCUIT CONFIGURATION FOR PRODUCING A SWITCHING SIGNAL FOR A CURRENT-CONTROLLED SWITCH-MODE POWER SUPPLY

(75) Inventors: Xiaowu Gong, Singapore (SG); Marc Fahlenkamp, München (DE); Harmut Jasberg, Ottobrunn (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/368,079

(22) Filed: Feb. 18, 2003

(65) Prior Publication Data

US 2003/0156433 A1 Aug. 21, 2003

Related U.S. Application Data

(63) Continuation of application No. PCT/EP01/09183, filed on Aug. 8, 2001.

(30) Foreign Application Priority Data

Aug. 18, 2000 (DE) .......................................... 100 40 413

(51) Int. Cl.$^7$ ............................................. H02M 3/335
(52) U.S. Cl. ............................. 363/21.01; 363/21.09; 363/21.17; 363/131
(58) Field of Search ........................ 363/16, 20, 21.01, 363/21.02, 21.04, 21.09, 21.12, 21.13, 21.17, 97, 131

(56) References Cited

U.S. PATENT DOCUMENTS 4,674,020 A   6/1987   Hill ........................... 363/21.17
5,717,578 A * 2/1998   Afzal ..................... 363/21.13 X
5,757,625 A   5/1998   Schoofs .................... 363/21.13
5,841,643 A * 11/1998  Schenkel .................. 363/21.13

OTHER PUBLICATIONS

Tietze–Schenk, Semiconductor Circuit Technology, 10$^{th}$ edition, Springer Verlag, Berlin, Heidelberg, New York, pp. 502–503, 507–509 and 520–521, as mentioned on p. 1 of the specification referring to the German version of Tietz-e–Schenk, (no date).

* cited by examiner

*Primary Examiner*—Jessica Han
(74) *Attorney, Agent, or Firm*—Laurence A. Greenberg; Werner H. Stemer; Ralph E. Locher

(57) ABSTRACT

A circuit configuration for generating a switching signal for a current controlled switched mode power supply includes a transformer with windings, a controlled power breaker, in series with a primary winding and a supply DC voltage, a control circuit, for cycle clocked switching of the power switch, a current measuring device measuring the current flowing through the power switch and generating a measured signal as a measure of the measured current value, a reference signal source generating a time-independent constant reference signal, and a comparator circuit comparing the measured signal with the reference signal and signaling the control circuit to switch off the power switch when the measured signal is greater than the reference signal. The reference signal source is connected to a compensation signal source to generate a compensation signal changing over time, the reference signal arising from the sum of the constant reference signal and the compensation signal.

36 Claims, 12 Drawing Sheets

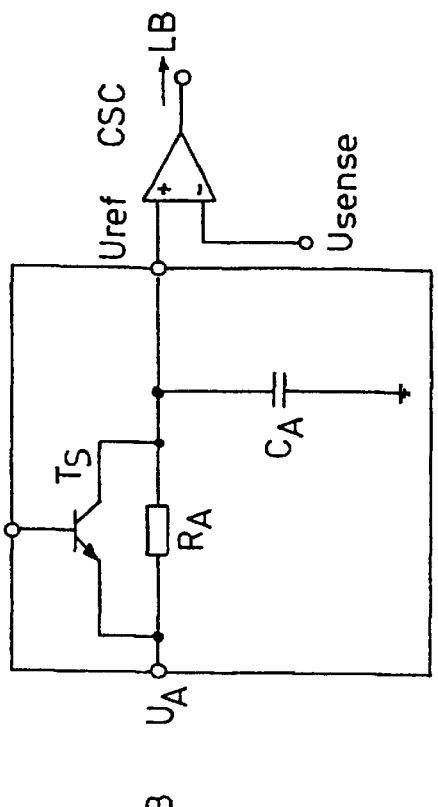
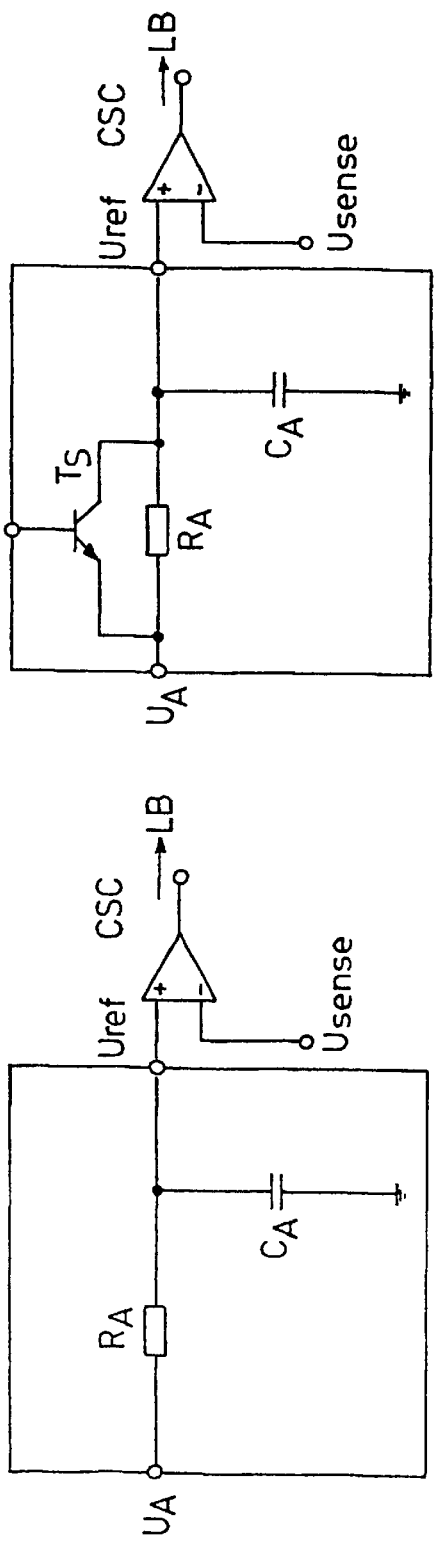
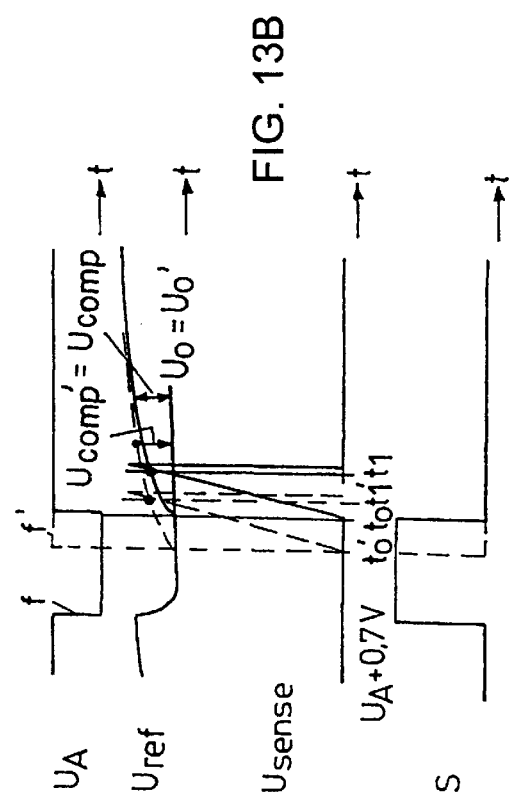

CIRCUIT CONFIGURATION FOR PRODUCING A SWITCHING SIGNAL FOR A CURRENT-CONTROLLED SWITCH-MODE POWER SUPPLY

CROSS-REFERENCE TO RELATED APPLICATION

This application is a continuation of copending International Application No. PCT/EP01/09183, filed Aug. 8, 2001, which designated the United States and was not published in English.

BACKGROUND OF THE INVENTION

1. Field of the Invention

The invention relates to a circuit configuration for producing a switching signal for a current-controlled switch-mode power supply that has a transformer with at least one primary winding and with at least one secondary winding.

Prior art circuit configurations such as these, on which the invention is based, are known in a large number of modified forms from the prior art. In such a context, reference should be made, for example, to "U. Tietze and Ch. Schenk, Halbleiterschaltungstechnik 10th edition, Springer Verlag, Berlin Heidelberg, N.Y., 1993, pages 561 et seq." These are based substantially on a controlled power switch that is connected in series with the primary winding to an input DC voltage. The circuit configuration also has a drive circuit for switching the power switch on and off clocked in time with a clock frequency, a current measurement device for measuring the current through the power switch and for producing a measurement signal that is a measure of the measured current, a reference signal source for producing a reference signal, with the reference signal being a constant reference signal that is independent of time, and a comparator circuit for comparing the measurement signal with the reference signal, with the comparator circuit being used to signal the drive circuit to switch off the power switch when the measurement signal is greater than the reference signal.

In principle, the method of operation of a switch-mode power supply such as this is as set forth in the following text.

The output voltage of the switch-mode power supply is regulated based upon evaluation of the current flowing through the power switch: first of all, a switching pulse from the drive circuit switches on the power switch. Due to the inductance of the primary winding of the transformer, which is connected in series with the control power switch, the current level of the current flowing through the power switch rises substantially linearly. When the current level reaches a specific value, then, the drive circuit switches the power switch off again.

The important factor in this case is that the current level of the current through the power switch does not exceed a maximum value. The maximum permissible value of the current level is dependent on the respective application, that is to say, on the applied input voltage and the load that is connected to the secondary side of the transformer. If the maximum value of the current level is exceed, then this leads to a high undesirable control error in the output voltage. In the worst case, if the maximum value of the current level through the power switch is exceeded, this can thermally overload and destroy the power switch. Furthermore, the excessively high output voltage on the second side of the transformer can lead to interference to the electrical supply to the load, or even to destruction of the load.

The signal for the drive circuit to switch off the power switch is generally produced by using a current measurement device to measure the current level of the current through the power switch. In such a case, a measurement signal is produced that is a measure of the measured current level of the current through the power switch. This instantaneous value is compared with a constant reference signal that is independent of time and is provided by the reference signal source mentioned above. If the measurement signal is higher than this reference signal provided, then the comparator circuit signals the drive circuit that it can switch off the power switch.

In current-controlled switch-mode power supplies such as these, the rate of rise of the current level of the current through the primary winding of the transformer and through the power switch is—as has already been indicated above—dependent on the respective operating state (operating voltage, load) of the application circuit.

In particular, this means that a higher input DC voltage results in the current level rising more rapidly. Furthermore, a greater load (higher output power, less load resistance), likewise, leads to the current level of the primary current through the primary winding and power switch rising more quickly.

Both the comparator circuit and the drive circuit with their integrated circuit blocks operate with delay times that are dependent on the circuitry. If the measurement signal, which is a measure of the measured current level of the measured primary-side current, reaches the value of the reference signal from the reference signal source, then the drive circuit switches off the power switch only after these signal delay times (gate delay times) resulting from these circuit blocks have elapsed. The current level on the primary side continues to rise linearly during these delay times.

The increase in the current level during these delay times is in this case dependent on the rate on which the current level rises, that is to say, on the respective operating state of the application circuit, and, hence, on the input voltage and output power. If the input voltage is low and the output power is low, the rate of rise of the current density on the primary side is low so that the increase in the current level during these delay times is also low. The control error, thus, remains low and there is no possibility of exceeding the maximum value, which could lead to thermal overloading and to destruction of the power switch and/or of the load. If the rate of rise is high, the change in the current level during the delay times caused by the circuitry is large. The control error is, thus, also large in a situation such as this. In this situation, the power switch and/or the load may very easily be thermally overloaded and destroyed if the maximum current level value is exceeded.

According to the prior art, the destruction of the power supply and/or of the load is prevented by selecting the components for the maximum power to be expected in the event of overloading.

SUMMARY OF THE INVENTION

It is accordingly an object of the invention to provide a circuit configuration for producing a switching signal for a current-controlled switch-mode power supply that overcomes the hereinafore-mentioned disadvantages of the heretofore-known devices of this general type and that minimizes the control error, which is dependent on the rate at which the current rises on the primary side.

With the foregoing and other objects in view, there is provided, in accordance with the invention, a circuit configuration for producing a switching signal for a current-controlled switch-mode power supply having transformer with at least one primary winding and with at least one secondary winding and an input DC voltage, including a controlled power switch to be connected to the input DC voltage in series with the at least one primary winding, a drive circuit connected to the power switch, the drive circuit switching the power switch on and off clocked in time with a signal having a clock frequency, a current measurement device connected to the power switch, the current measurement device measuring a current level through the power switch and producing a measurement signal being a measure of the measured current level, a reference signal source producing a reference signal, the reference signal being a constant reference signal independent of time, a comparator circuit connected to the drive circuit, to the current measurement device, and to the reference signal source, the comparator circuit comparing the measurement signal with the reference signal and signaling the drive circuit to switch off the power switch when the measurement signal is greater than the reference signal, and the reference signal source having an associated compensation signal source producing a compensation signal varying with time, the reference signal being obtained from a sum of the constant reference signal and the compensation signal, the reference signal at a time at which the power switch is switched on having a value less than at a time of the signal at which the power switch is switched off.

The major idea of the invention is to compensate in a suitable manner for the delay times due to the comparator circuit and drive circuit. To such an end, the invention provides for the reference signal source to have an associated compensation signal source for producing a compensation signal that varies with time, such that the reference signal is obtained from the sum of the reference signal, which is constant over time, and the compensation signal. The reference signal, which is constant over time, and the compensation signal, which varies with time, can, in this case, be chosen such that the reference signal increases from the time at which the power switch is switched on until the signal is produced to switch off the power switch. If the rate of rise of the current level of the primary-side current through the primary winding and power switch is low, then the associated measurement signal does not become greater than the reference signal until a lengthy time has passed. The signal for switching off the power switch is, thus, not transmitted to the drive circuit until a very late state. On the other hand, if the rate of rise of the current level on the primary side is very high, then the measurement signal (which is a measure of the measured current level on the primary side) becomes greater than the value of the reference signal at an early stage. The signal to switch off the power switch is, thus, passed to the drive circuit at a very early time. Because the current rise that takes place during these delay times still takes place at a high rate, the early signaling allows the power switch to be switched off in good time, without the maximum permissible value of the current level being exceeded in an undesirable manner. If the constant reference signal and the compensation signal that varies with time are configured appropriately, an output voltage control error can be achieved that is substantially independent of the rate of rise of the current level on the primary side.

In accordance with another feature of the invention, the controlled power switch is an MOS field-effect transistor. Because the main aim of avoiding an undesirable control error in the output voltage is to reduce thermal overloading, a voltage-controlled (field-effect) transistor, which can, thus, be driven at a low power level, is preferred to a current-controlled (bipolar) transistor. A field-effect transistor such as this, furthermore, has the advantage that the technology allows it to be configured very easily for any desired power levels.

In accordance with a further feature of the invention, the measurement signal is a current measurement voltage signal. A voltage signal such as this for measuring the current level on the primary side can be produced very easily with the aid of a current measurement resistor that is connected in the primary circuit, including the primary winding and power switch.

The comparator circuit can, then, be produced very easily with the aid of a conventional comparator (current sense comparator), which is known from the prior art.

In accordance with yet another feature of the invention, the current measurement device is a current measurement resistor.

In accordance with yet a further feature of the invention, the comparator circuit is a current sense comparator.

The invention provides for the reference signal to assume the value of the constant reference signal once the power switch has been switched on, increasing until the signal to switch off the power switch is produced, before falling once again to the initial value of the constant reference signal at the latest once the power switch has been switched off. The reference signal, thus, represents a substantially periodic signal that oscillates in time with the clock frequency at which the power switch is switched on and off. Because a periodic clock signal such as this is provided in any case for driving the power switch, an alternating reference signal such as this can easily be produced. The decrease in the reference signal at the end of a clock cycle to the initial value, which corresponds to the value of the constant reference signal, ensures that defined switching processes take place.

The invention provides for the compensation signal once the power switch has been switched on to be an exponentially rising signal, a linearly rising signal, a signal that rises in accordance with a square law or a signal that rises in accordance with a power function. On one hand, signal profiles such as these can be produced very easily using conventional circuit technology while, on the other hand, they allow easy matching to any specific application.

For such a purpose, the invention furthermore provides for the constant reference signal and/or the profile of the compensation signal to be (externally) adjustable, without needing to change the entire circuit configuration.

An "external" adjustment capability does not just mean that a pin at which the reference signal can be adjusted is available in a circuit configuration according to the invention that is in the form of an integrated circuit. An "external" adjustment capability also means that the reference signal is set during the so-called wafer measurement by connecting internal resistances in parallel by a so-called "zener zap". External, thus, means "automatic" adjustment based upon the input voltage and/or load.

This allows large-scale manufacture, while, nevertheless, allowing individual matching to the application.

In accordance with an added feature of the invention, the compensation signal source is a differential amplifier. The non-inverting input of this reference amplifier is connected to the reference ground potential through a non-reactive resistor. A constant reference voltage, which already exists in a circuit configuration according to the prior art, is connected to the non-inverting input through a further non-reactive resistor. The non-inverting input is, furthermore, supplied through a non-reactive resistor with a frequency signal that alternates at the clock frequency. The inverting input of the differential amplifier is connected to the reference ground potential through a non-reactive resistor. The output of the differential amplifier is fed back to the inverting input through a non-reactive coupling resistor. A non-reactive output resistor is connected to the output of the differential amplifier, and is, in turn, connected through an output capacitor to the reference ground potential. The reference voltage can be tapped off at the node between the output resistor and the output capacitor. The reference voltage is a sawtooth-like signal, which is repeated cyclically in time with the clock frequency. In such a case, it shall be regarded as being advantageous, on one hand, that it can be produced in a very simple manner and, on the other hand, that it can be matched to any application, as will be explained in more detail in the following example.

An alternative embodiment thereto provides for the compensation signal source to be a differential amplifier. In accordance with an additional feature of the invention, the non-inverting input of this differential amplifier is connected through a non-reactive resistor to the reference ground potential. Furthermore, this non-inverting input is supplied with a constant reference voltage through a non-reactive resistor. In addition, the non-inverting input is connected to the reference ground potential in time with the clock frequency of the clock voltage signal through a non-reactive resistor, with the aid of a bipolar transistor that is connected in series with non-reactive resistor and whose base is driven with the aid of a clock voltage signal. The inverting input of the differential amplifier is connected to the reference ground potential through a non-reactive resistor. The output of the differential amplifier is fed back to the inverting input through a non-reactive coupling resistor. A reference voltage can be tapped off across a non-reactive output resistor that is connected to the output, with the non-reactive output resistor being connected to the reference ground potential through an output capacitor. Like the previous refinement of the invention, this refinement of the invention represents a circuit configuration that can be implemented very easily and that complies with all the requirements for the reference voltage signal to be produced.

In accordance with yet an added feature of the invention, the constant reference signal is a constant reference voltage, a first non-reactive resistor is supplied with the constant reference voltage, a second non-reactive resistor is supplied with an alternating signal alternating in time with the clock frequency, a third non-reactive resistor is connected to a reference ground potential, a fourth non-reactive resistor is connected to the reference ground potential, the compensation signal source is a differential amplifier having a non-inverting input supplied with the constant reference voltage through the first non-reactive resistor, supplied with the alternating signal through the second non-reactive resistor, and connected through the third non-reactive resistor to the reference ground potential, an inverting input connected to the reference ground potential through the fourth non-reactive resistor, and an output producing an output voltage, a non-reactive coupling resistor is connected to the inverting input and to the output and feeds the output back to the inverting input, a non-reactive output resistor is connected to the output, the reference signal is a reference voltage tapped off across the non-reactive output resistor, and an output capacitor connects the non-reactive output resistor to the reference ground potential.

In accordance with yet an additional feature of the invention, the constant reference signal is a constant reference voltage, a first non-reactive resistor is supplied with the constant reference voltage, a second non-reactive resistor is provided, a third non-reactive resistor is connected to a reference ground potential, a bipolar transistor is connected in series with the second non-reactive resistor and has a base, a clock voltage signal is connected to and drives the base, the compensation signal source is a differential amplifier having a non-inverting input supplied with the constant reference voltage through the first non-reactive resistor, connected through the third non-reactive resistor to the reference ground potential, and with aid of the bipolar transistor, is connected to the reference-ground potential in time with the clock frequency through the second non-reactive resistor, an inverting input, and an output producing an output voltage, a non-reactive output resistor is connected to the inverting input and to the output and feeds the output back to the inverting input, the reference signal is a reference voltage tapped off across the non-reactive output resistor, and an output capacitor connects the non-reactive output resistor to the reference ground potential.

One having skill in the art in the relevant field of technology would understand that the circuitry of the inverting and non-inverting inputs of the differential amplifiers can also be interchanged, if the respective output signals are inverted in a corresponding manner.

In accordance with again another feature of the invention, a switch is disposed in parallel with the compensating resistor or the non-reactive output resistor, which switch bridges the output resistor when it is closed so that the current flow is substantially passed through this switch. The invention provides for this switch to be closed when the output voltage is low and to be opened when the output voltage is high. Such a measure means that the reference voltage substantially follows the output voltage when the output voltage is low.

When the output voltage is high, the reference voltage is the instantaneous charge voltage on the output capacitor, which is now charged through the non-reactive output resistor.

In accordance with again a further feature of the invention, the switch that is used is a transistor, preferably, a bipolar transistor because its switched-on resistance is lower.

The invention, furthermore, provides for the switch to be opened and closed in time with the alternating signal or the alternating clock voltage signal. Thus, the switch is opened and closed in time with the power switch.

In accordance with again an added feature of the invention, the entire circuit configuration is integrated in a switch-mode power supply controller. An implementation such as this in the form of an integrated circuit is particularly advantageous for large-scale series production.

With the objects of the invention in view, there is also provided a circuit configuration for producing a switching signal for a current-controlled switch-mode power supply, including an input DC voltage source providing an input DC voltage, a transformer with at least one primary winding and with at least one secondary winding, a controlled power switch connected to the input DC voltage source in series with the at least one primary winding, a drive circuit connected to the power switch, the drive circuit switching the power switch on and off clocked in time with a signal having a clock frequency, a current measurement device connected to the power switch, the current measurement device measuring a current level through the power switch and producing a measurement signal being a measure of the measured current level, a reference signal source producing a reference signal, the reference signal being a constant reference signal independent of time, a comparator circuit connected to the drive circuit, to the current measurement device, and to the reference signal source, the comparator circuit comparing the measurement signal with the reference signal and signaling the drive circuit to switch off the power switch when the measurement signal is greater than the reference signal, and the reference signal source having an associated compensation signal source producing a compensation signal varying with time, the reference signal being obtained from a sum of the constant reference signal and the compensation signal, the reference signal at a time at which the power switch is switched on having a value less than at a time of the signal at which the power switch is switched off.

The invention, furthermore, provides for the current measurement device, and, in particular, the current measurement resistor, to be disposed externally. The external configuration allows the measurement range and control range to be matched to the respective application. In particular, the capability for external trimming to the respective primary current level simply by replacing the current measurement device (a current measurement resistor with a different resistance value) is advantageous when the switch-mode power supply controller is used with widely differing input voltages and widely differing output power levels.

In accordance with a concomitant feature of the invention, the circuit configuration or the switch-mode power supply controller is used for producing a switching signal for a flyback converter. This is envisaged both for use with a fixed-frequency flyback converter and with a quasi-resonant flyback converter. It can also be used to produce switching signals for a forward converter and a boost converter. All these exemplary embodiments of the invention have the aim of producing a modular structure that can be used universally. The invention provides only for those components to be disposed externally that are absolutely necessary for adjustment of the reference signal or for selection of the measurement range of the current measurement device.

Other features that are considered as characteristic for the invention are set forth in the appended claims.

Although the invention is illustrated and described herein as embodied in a circuit configuration for producing a switching signal for a current-controlled switch-mode power supply it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 12A is a block and schematic circuit diagram of a detail from the reference signal sources as shown in FIGS. 7, 8A, 8B, and 9;

FIG. 12B is a set of timing diagrams from the reference signal sources of FIGS. 7, 8A, 8B, and 9 with the time profile of the signals $U_A$, $U_{ref}$, and $U_{sense}$;

FIG. 13A is a block and schematic circuit diagram of a detail of FIG. 12A with a transistor switch according to the invention for bridging the output resistor $R_A$; and FIG. 13B is a set of timing diagrams of the signals $U_A$, $U_{ref}$ and $U_{sense}$, as well as the switching signal for the transistor switch, of the detail of FIG. 12A with the transistor switch according to the invention for bridging the output resistor $R_A$.

DESCRIPTION OF THE PREFERRED EMBODIMENTS

Figure 1:
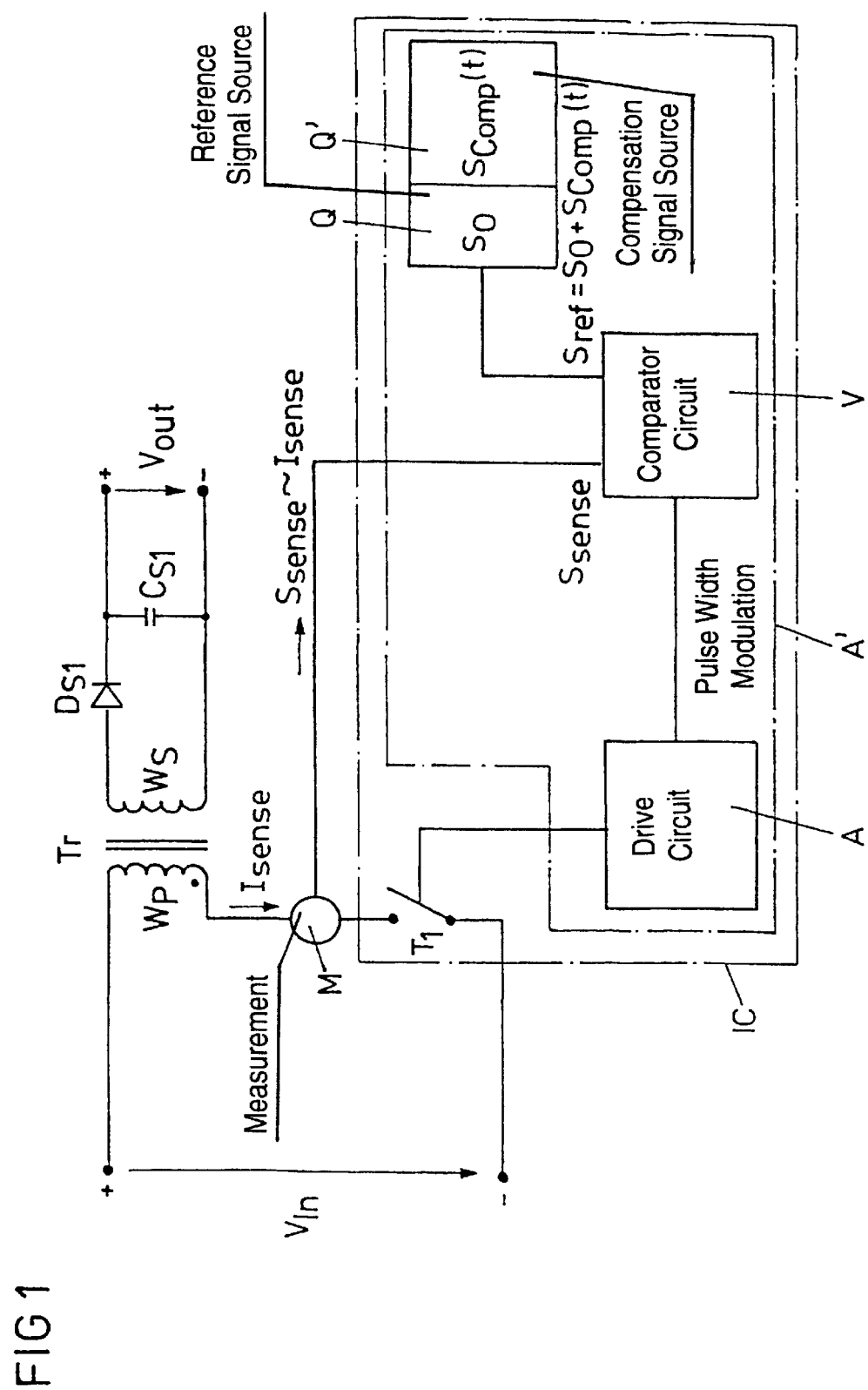
FIG. 1 is a block and schematic circuit diagram of a circuit configuration of a switch-mode power supply controller according to the invention with a power switch for driving a single-ended flyback converter.

Referring now to the figures of the drawings in detail and first, particularly to FIG. 1 thereof, there is shown a circuit configuration according to the invention for driving a switch-mode power supply. In the example, the switch-mode power supply is a simple single-ended flyback converter.

The simple flyback converter includes a transformer Tr with a primary winding $w_p$ and a secondary winding $w_s$. A clocked power switch $T_1$ is connected in series with the primary winding $w_p$. An input DC voltage $V_{In}$ is applied to the two terminals "+" and "−" of the primary circuit. The value of the input DC voltage $V_{In}$ is generally in the range between a few volts and 400 volts.

The secondary winding $w_s$ is followed by a (rectifier) diode $D_{s1}$ and the charge-storage or smoothing capacitor $C_{s1}$. The compensating voltage $V_{out}$ can be tapped off at the appropriate terminals.

The switching signal is generally produced with the aid of two modules: a pulse width modulator and a regulator with a voltage reference. The method of operation and circuitry are described, for example, in the book "Halbleiterschaltungstechnik" [Semiconductor circuit technology] by U. Tietze and Ch. Schenk, 10th edition, Springer-Verlag, Berlin, Heidelberg, N.Y., 1993, page 566 et seq.

In the present example as shown in FIG. 1, the module for switching the power switch $T_1$ on and off in a clocked manner is annotated as the drive circuit A. The signal transmitter that passes to the drive circuit A the signal for switching off the power switch $T_1$ is annotated as the comparator circuit V. The primary circuit, which includes the primary winding $w_p$ and the power switch $T_1$, also contains a current measurement device M, which is intended for measuring the current level $I_{sense}$ through the power switch $T_1$ and for producing a measurement signal $S_{sense}$ that is a measure of the measured current level $I_{sense}$.

The measurement signal $S_{sense}$ is, in the example, directly proportional to the current level $I_{sense}$ through the power switch $T_1$ and is supplied to the comparator circuit V. In the comparator circuit V, the measurement signal $S_{sense}$ is compared with a reference signal $S_{ref}$, which is provided by a reference signal source Q.

According to the prior art, the reference signal $S_{ref}$ is a constant signal that is independent of time. In the example, this constant reference voltage signal (which is independent of time) is annotated by the reference symbol $S_0$.

As long as the measurement signal $S_{sense}$ is less than the reference signal $S_{ref}$, the power switch $T_1$ remains closed. If the measurement signal $S_{sense}$ exceeds the value of the reference signal $S_{ref}$, the comparator signal V signals the drive signal A to open the power switch $T_1$. This procedure is repeated in time with a clock frequency f, which is generally predetermined by the drive circuit A.

The series connection of the inductance formed by the primary winding $w_p$ of the transformer Tr and the power switch $T_1$ results in the current level $I_{sense}$ in the primary circuit rising linearly. The measurement signal $S_{sense}$ likewise rises until it exceeds the value of the reference signal $S_{ref}$, and the comparator circuit V signals the drive circuit A to switch off the power switch $T_1$.

According to the invention, the reference signal source Q has an associated compensation signal source Q' for producing a compensation signal $S_{comp}$ that varies with time. The reference signal $S_{ref}$ is obtained, as shown in the drawing, from the sum of the constant reference signal $S_0$ and the compensation signal $S_{comp}$. The compensation signal $S_{comp}$ rises, according to the invention, during one clock cycle after the power switch $T_1$ has been switched on until the signal is produced to switch off the power switch $T_1$.

In the present exemplary embodiments shown in FIGS. 1, 2, 3, and 4, the combination of the drive circuit A, the comparator circuit V, the reference signal source Q, and the compensation signal source Q' is referred to as a pulse width modulation controller A'. By way of example, this pulse width modulation controller A' is combined with the power switch $T_1$ to form a switch-mode power supply controller IC.

Figure 2:
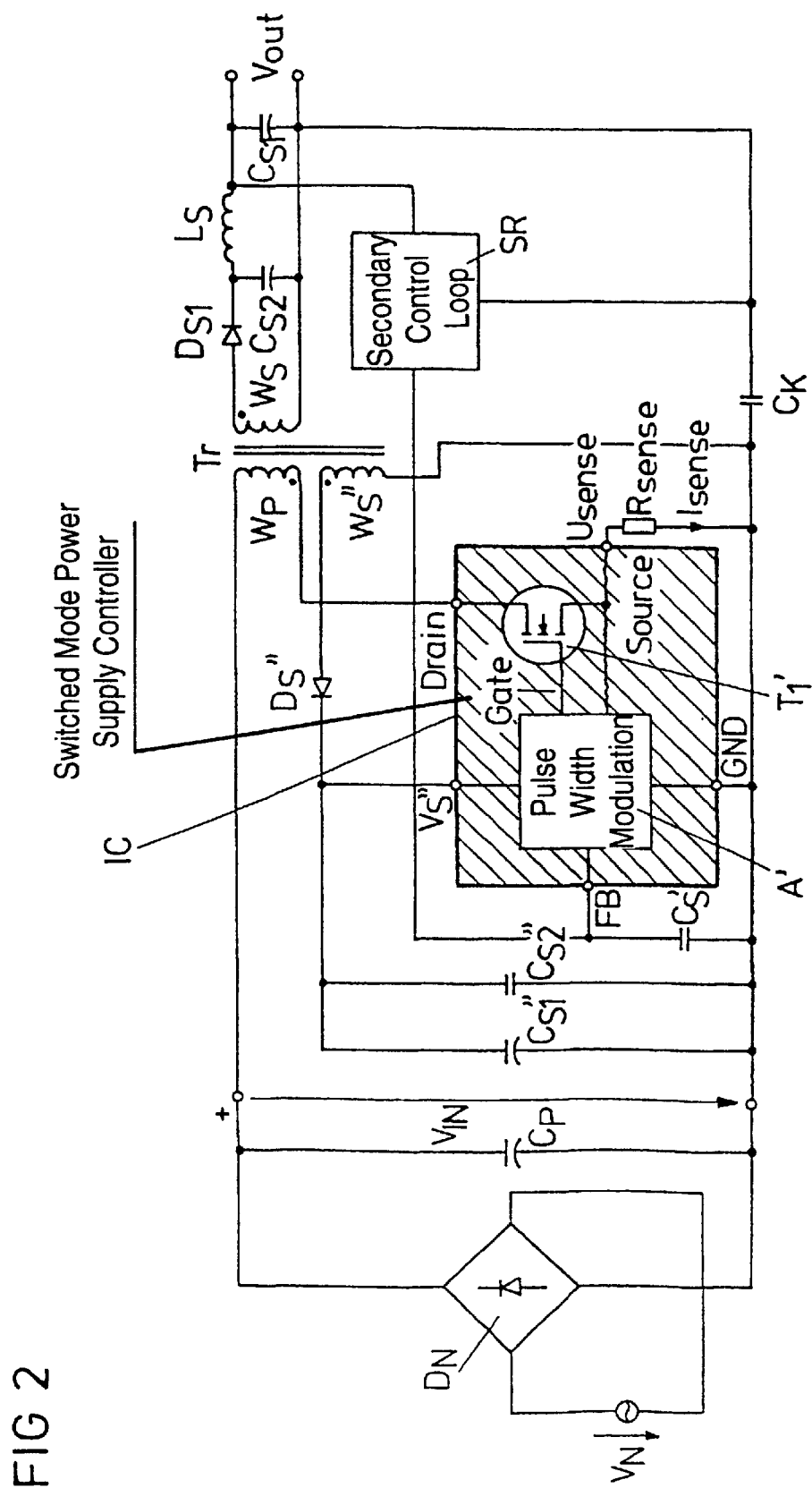
FIG. 2 is a block and schematic circuit diagram of a circuit configuration of a switch-mode power supply controller with a power switch and an internal oscillator for driving a switch-mode power supply based on the principle of a fixed-frequency flyback converter in the current mode.
Figure 3:
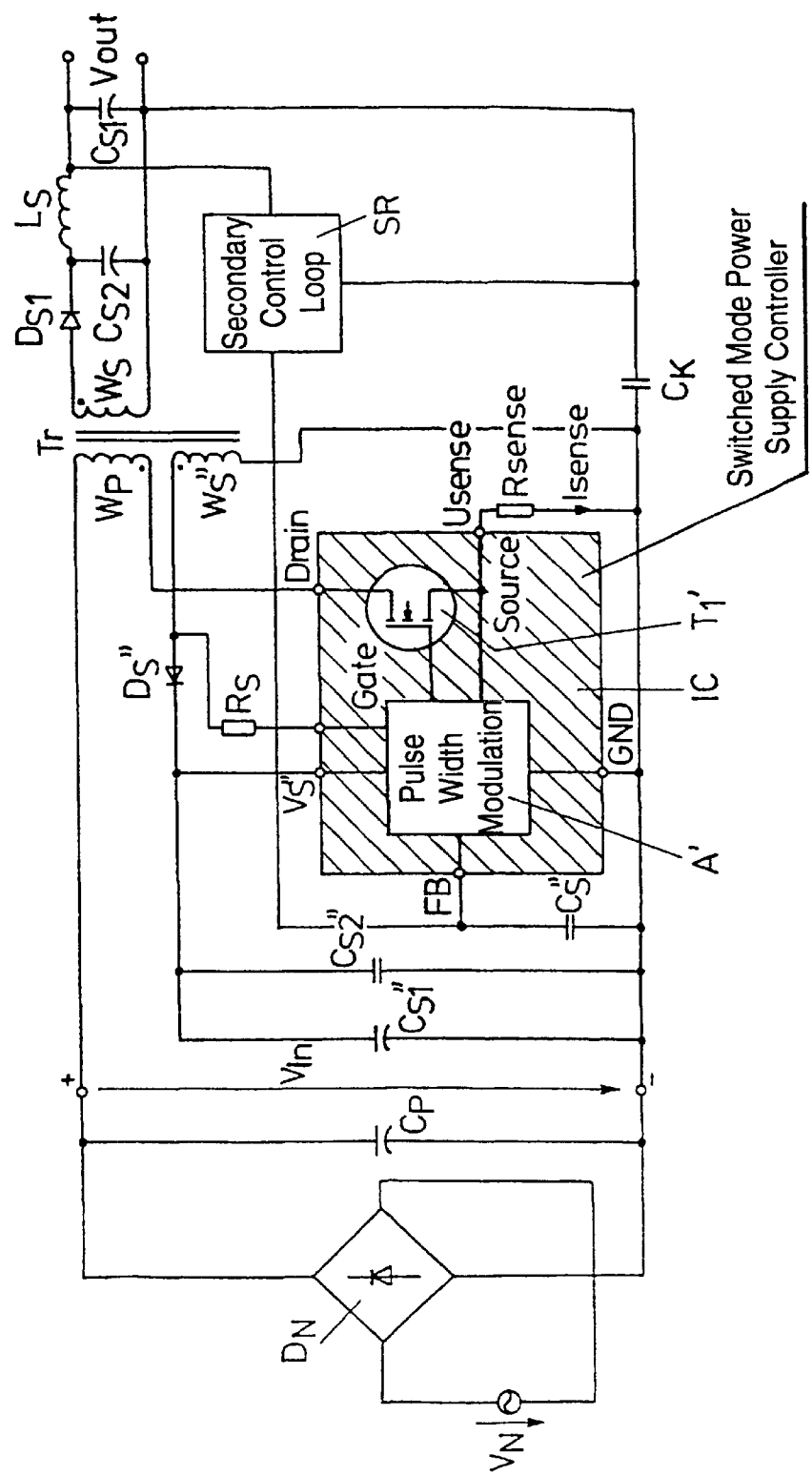
FIG. 3 is a block and schematic circuit diagram of a circuit configuration of a switch-mode power supply controller with a power switch for driving a switch-mode power supply based on the principle of a free-running flyback controller in the current mode.
Figure 4:
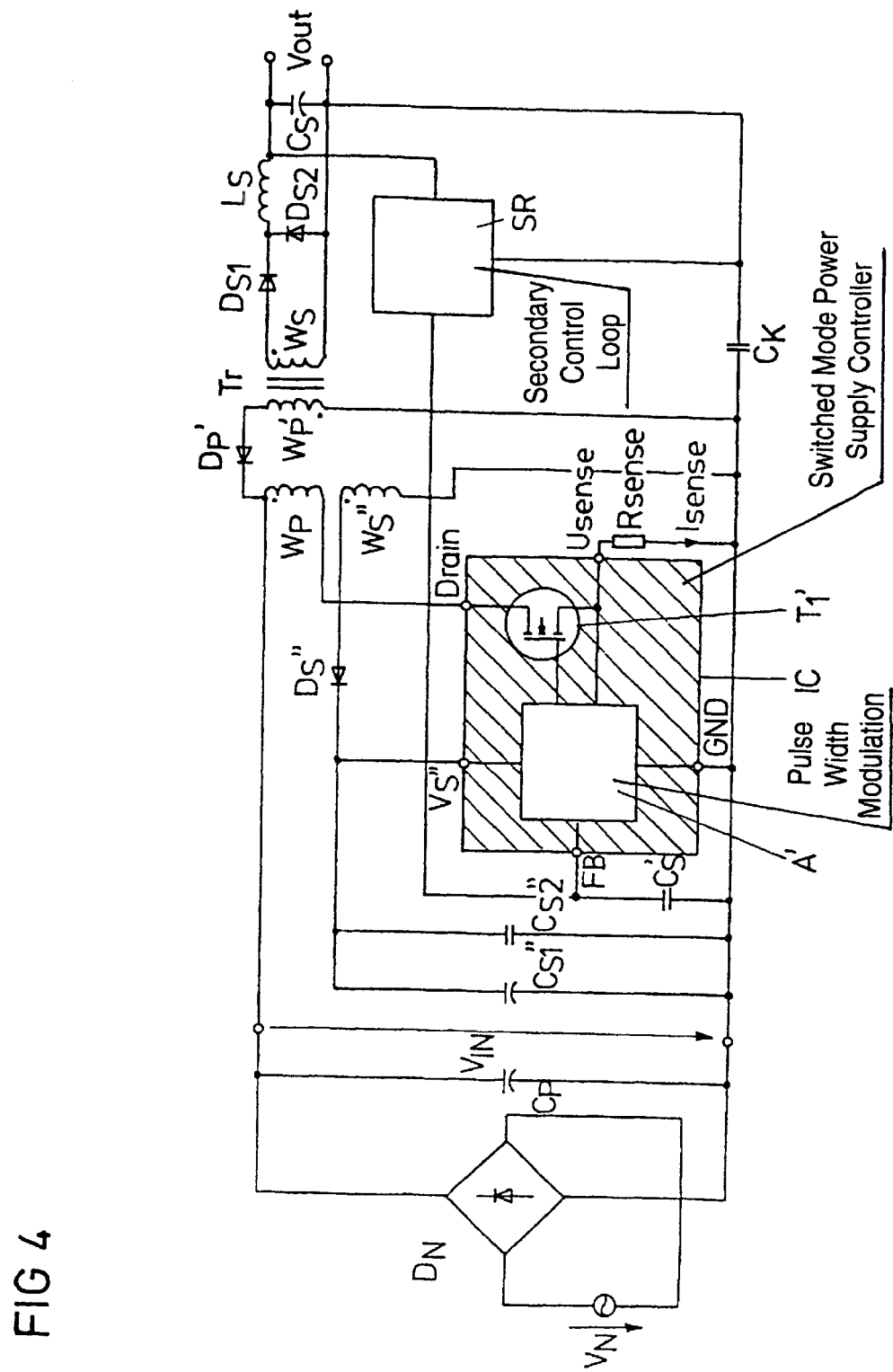
FIG. 4 is a block and schematic circuit diagram of a circuit configuration of a switch-mode power supply controller with a power switch and an internal oscillator for driving a switch-mode power supply based on the principle of a forward controller in the current mode.

In FIGS. 2, 3, and 4, switch-mode power supply controllers IC such as these are integrated with a power switch $T_1$ in a series of circuit configurations for driving different switch-mode power supplies. The switch-mode power supply controllers IC and the pulse width modulation controllers A' can be replaced as required by corresponding circuit configurations according to the prior art or according to the invention.

FIG. 2 shows a circuit configuration including a switch-mode power supply controller IC with a power switch and an internal oscillator for driving a switch-mode power supply based on the principle of a fixed-frequency flyback controller in the current mode. A fixed-frequency flyback controller such as this is based on a transformer Tr with a primary winding $w_p$ and two secondary windings $w_s$ and $w_s"$. As in the previous example shown in FIG. 1, the primary winding $w_p$ is connected in series with the controlled switch that, in the example, is in the form of a MOSFET power transistor $T_1$ and a current measurement device that, in the example, is in the form of a measurement resistor $R_{sense}$. The measurement resistor $R_{sense}$, across that the current measurement voltage $U_{sense}$ (which is proportional to the current level $I_{sense}$) is dropped, is disposed externally in the example. The input DC voltage $V_{In}$ is applied to the terminals "+" and "−" of this series circuit. The negative terminal "−" at the same time forms the reference ground potential GND.

The input DC voltage $V_{In}$ is formed from an input AC voltage signal $V_N$, which is rectified with the aid of a (bridge) rectifier $D_N$ and is smoothed with the aid of a smoothing capacitor $C_p$.

As in the previous example, the secondary winding $w_s$ is followed by a rectifier $D_{S1}$ and an energy-storage or smoothing capacitor $C_{S2}$. An energy-storage inductor $L_S$ is connected to one terminal of the smoothing capacitor $C_{S2}$ and is followed by a further smoothing capacitor $C_{S1}$. The output DC voltage $V_{out}$ can be tapped off at the terminals of the further smoothing capacitor $C_{S1}$.

The output DC voltage $V_{out}$ is supplied to a secondary control loop SR, with one terminal being connected to the reference ground potential GND through the coupling capacitor $C_K$. The output from the secondary control loop SR is passed to the feedback input FB of the switch-mode power supply controller IC, with the feedback input FB being connected to the reference ground potential through the smoothing capacitor $C_S'$. The signal at the feedback input FB includes the control information relating to the state of the output voltage $V_{out}$.

The secondary winding $w_s"$, which is generally referred to as an auxiliary winding $w_s$, is connected on one side to the reference ground potential GND and on the other side through the diode $D_S"$ to one of the inputs of the switch-mode power supply controller IC, and, in the process, is used for application of the supply voltage $V_S$. Two further smoothing capacitors $C_{S1}"$ and $C_{S2}"$ are provided for smoothing the supply voltage $V_S"$.

FIG. 3 shows a circuit configuration of a switch-mode power supply controller IC with a power switch for driving a switch-mode power supply based on the principle of a free-running flyback controller in the current mode. The circuit configuration for the fixed-frequency flyback controller shown in FIG. 2 and for that of the free-running flyback controller shown in FIG. 3 are virtually identical. While, in the case of the fixed-frequency flyback controller, the clock for switching the power switch on and off is produced with the aid of an oscillator that is integrated in the switch-mode power supply controller IC, the clock pulse in the free-running flyback controller is generated by the auxiliary conversion $w_s''$ of the transformer Tr, which conversion is coupled through the resistor $R_S$ to the drain connection of the MOSFET power transistor $T_1'$.

FIG. 4 shows a circuit configuration for a switch-mode power supply controller IC with a power switch and an internal oscillator for driving a switch-mode power supply based on the principle of a forward controller in the current mode. This circuit configuration for a forward controller that is known per se differs from a fixed-frequency flyback controller in that the capacitance $C_{S2}$ on the secondary side is replaced by a diode $D_{S2}$. For voltage limiting in the transformer Tr, this transformer has a further primary winding $w_p'$, which is connected through the diode $D_p'$ to the primary winding $w_p$, and is connected on the other side to the reference ground potential GND. The basic structure and method of operation of such circuit configurations shown in FIGS. 2 to 4 can be found, for example, in the already cited literature reference "U. Tietze and Ch. Schenk, Loc. cit.". The different control response of the circuit configurations with a switch-mode power supply controller according to the prior art and with a switch-mode power supply controller according to the invention will be described in detail in the following text.

Figure 5:
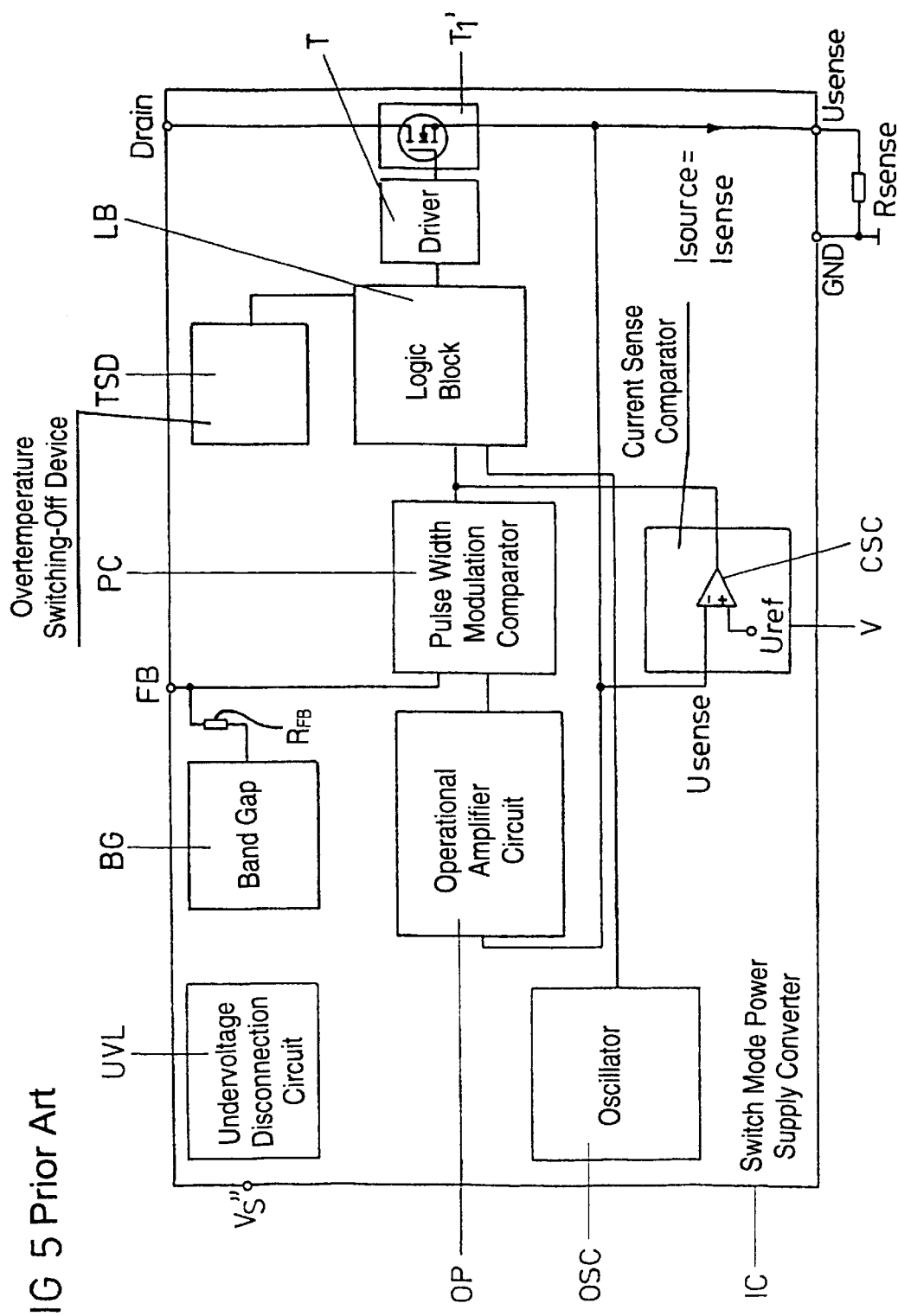
FIG. 5 is a block and schematic circuit diagram of a prior art circuit configuration of a switch-mode power supply controller with a power switch.
Figure 7:
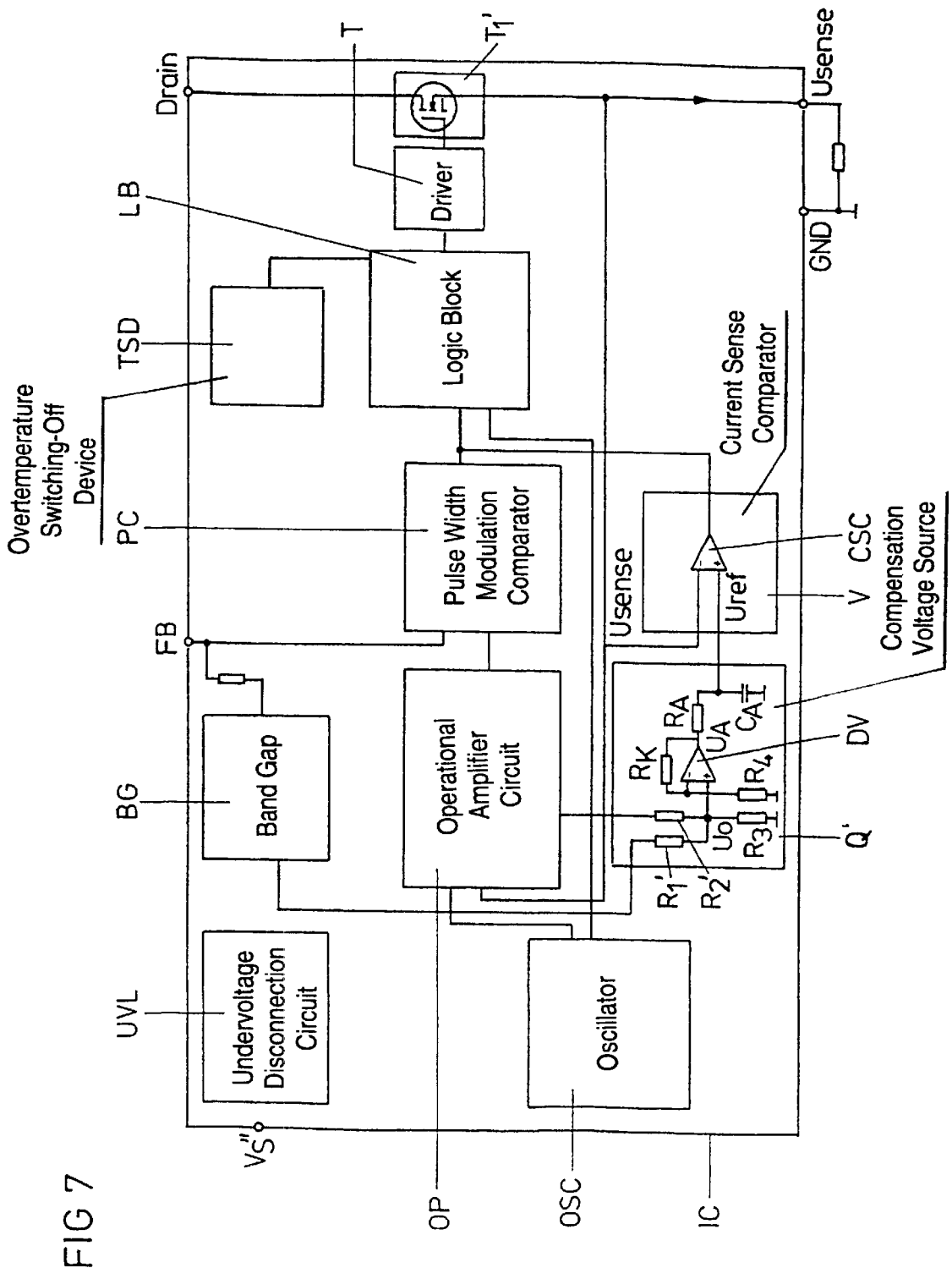
FIG. 7 is a block and schematic circuit diagram of a circuit configuration of a switch-mode power supply controller with a power switch according to the invention.

FIG. 5 shows a circuit configuration for a switch-mode power supply controller with a power switch and an internal oscillator according to the prior art, FIG. 7 shows a circuit configuration of a switch-mode power supply controller with a power switch and an internal oscillator according to the invention. Both circuit configurations of a switch-mode power supply controller can be used in FIGS. 2 to 4 instead of the circuit block identified by the reference symbol IC.

The method of operation of such a circuit configuration according to the invention as shown in FIG. 7 will be explained in the following text using the example of the fixed-frequency flyback controller shown in FIG. 2. In comparison to this, the control response of a circuit configuration of a switch-mode power supply controller according to the prior art, and as shown in FIG. 5, will also be described in the following text.

The switch-mode power supply controller IC illustrated in FIG. 5 and according to the prior art has the following connections and circuit units, which are identified by reference symbols.

The switch-mode power supply controller IC has a connection for the supply voltage $V_s''$, a feedback input FB, a drain connection and a source connection of the power MOSFET, and a reference ground potential connection GND.

The feedback input FB is connected through a resistor $R_{FB}$ to a circuit with which a high-precision voltage reference is produced, with the so-called band gap BG. The feedback input is also connected to a first input of the pulse width modulation comparator PC. The source connection (source) of the MOSFET $T_1'$ is connected to the input of an operational amplifier circuit OP. The output of the operational amplifier circuit OP is connected to a second input of the pulse width modulation comparator PC. The output of the pulse width modulation comparator PC is connected to one input of the logic block LB. Furthermore, the inverting input of the current sense comparator CSC is connected to the source connection (source) of the MOSFET $T_1'$. The non-inverting input of the current sense comparator CSC is connected to a reference voltage source, which supplies an internal reference voltage $U_{ref}$. The output of the current sense comparator CSC is connected to the input of the logic block LB and to the output of the pulse width modulation comparator PC. The oscillator OSC is connected to a further input of the logic block LB. A further input of the logic block LB is connected to an overtemperature switching-off device TSD, which emits a signal to switch off the power MOSFET $T_1'$ (temp shutdown) when a maximum chip temperature, which is predetermined internally, is exceeded. The output of the logic block LB is connected to the driver T. The output of the driver T is, in turn, connected to the gate connection (gate) of the MOSFET $T_1'$.

The method of operation of the switch-mode power supply controller IC according to the prior art is described in the following text.

The (source) current with the current level $I_{sense}$ flows through the current measurement resistor $R_{sense}$ where it produces a voltage drop $U_{sense}$. In the example, the current measurement resistor $R_{sense}$ is in the form of an external resistor. However, it may also be integrated in the switch-mode power supply controller IC. The voltage $U_{sense}$ is applied to the inverting input of the integrated current sense comparator CSC, and is compared with an internally produced reference voltage $U_{ref}$, which is constant over time and is applied to the non-inverting input of the current sense comparator CSC that is, for example, in the form of an operational amplifier. If $U_{sense}$ exceeds the value of $U_{ref}$, then the current sense comparator CSC switches the power transistor $T_1'$ off. The power transistor $T_1'$ is switched on again by the next clock pulse. In the fixed-frequency flyback controller, the clock pulse is generated by the internally disposed oscillator OSC.

It should be noted that the clock pulse can also be generated by an auxiliary winding $w_s''$, which is coupled to the drain connection of the MOSFET power transistor $T_1'$. In this case, this is a free-running flyback controller, as is illustrated by way of example in FIG. 3.

Both in the case of a fixed-frequency flyback controller and in the case of a free-running flyback controller, the rate of rise dI/dt of the (source) current level $I_{sense}$ is dependent on the respective operating state of the application circuit. The current sense comparator CSC and the downstream circuit blocks operate with delay times resulting from the circuitry. If the current measurement voltage signal $U_{sense}$ reaches the value of the reference voltage $U_{ref}$ (which is constant over time), then the flyback controller does not switch the MOSFET power transistor $T_1'$ off until these delay times have elapsed. During these delay times of the signal by the downstream circuit blocks for signaling to switch off the MOSFET power transistor $T_1'$, whose sum is identified in FIGS. 6A and 6B by the reference symbol $t_{delay}$, the (source) current level $I_{sense}$ continues to rise linearly, as can be seen from FIGS. 6A and 6B. The MOSFET power transistor $T_1'$ switches off only at an instantaneous (source) current level $I_{senseact}$, which is composed of the sum of the nominal current level $I_{sensenom}$ at the time of the signaling to switch off the power transistor and the increase $I_{delay}$ in the current level during the total delay time $t_{delay}$ of the signal:

$$I_{senseact} = I_{sensenom} + I_{delay} \qquad (1)$$

The nominal current level $I_{sensenom}$ can be assumed to be constant, while $I_{delay}$ is dependent on the rate of rise $dI_{sense}/dt$ of the (source) current level $I_{sense}$. The total delay time $t_{delay}$ is generally virtually independent of the rate of rise $dI_{sense}/dt$ of the (source) current level $I_{sense}$.

Figure 6:
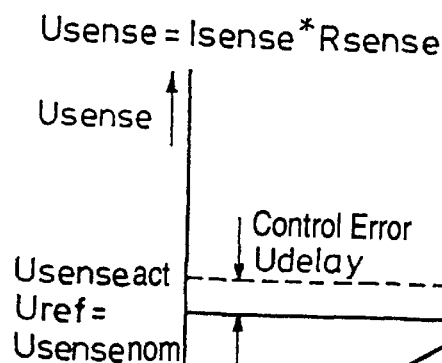
FIG. 6A is a graph illustrating how the power switch according to the prior art is switched off when the current in the power switch is rising slowly.
FIG. 6B is a graph illustrating how the power switch according to the prior art is switched off when the current in the power switch is rising quickly.
Figure 6:
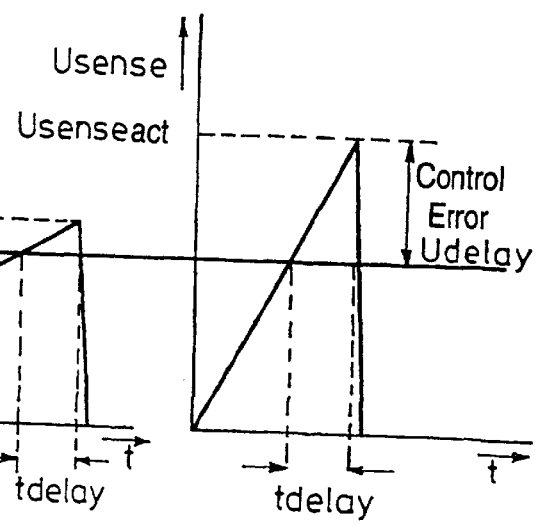

If the rate of rise $dI_{sense}/dt$ is low, $I_{delay}$ and, hence, the control error are small (see FIG. 6A). If the rate of rise $dI_{sense}/dt$ is high, then $I_{delay}$ is large, thus, the control error is also large (see FIG. 6B).

In contrast thereto, a switch-mode power supply controller IC according to the invention operates as set forth in the following text.

The total delay time $t_{delay}$ is compensated for in the circuitry such that the influence of the rate of rise $dI_{sense}/dt$ is minimized to the maximum value of the (source) current level $I_{sense}$, and, in consequence, this is largely independent of the operating parameters.

For such a purpose, the internal reference voltage $U_{ref}$ is not kept constant, as in the previous example according to the prior art, but is modulated. When the MOSFET power transistor $T_1'$ is switched on, a compensation voltage $U_{comp}$ is added to a constant reference voltage $U_0$:

$$U_{ref}=U_0+U_{comp} \tag{2}$$

The circuit configuration according to the prior art, as is illustrated in FIG. 5, has a further component added to it (see FIG. 7) in order to produce such a reference voltage $U_{ref}$ that varies with time. This further component includes a compensation voltage source Q'. The compensation voltage $U_{comp}$ is produced in this compensation voltage source Q'. This compensation voltage source Q' is supplied on the input side with the reference voltage $U_0$, which is constant over time. The reference voltage $U_{ref}$, which varies with time, can be tapped off at its output. The reference voltage $U_0$ that is constant over time is provided by a circuit with which a high-precision voltage reference is produced, the band gap BG.

The reference voltage $U_{ref}$ that varies with time and is produced at the output is supplied, as in the previous example according to the prior art, to the non-inverting input of the current sensor comparator CSC. In the example, the compensation voltage source Q' is based on a differential amplifier with an inverting input and a non-inverting input, and one output. The inverting input is connected through a non-reactive resistor $R_4$ to the reference ground potential GND. The non-inverting input is, likewise, connected through a non-reactive resistor $R_3'$ to the reference ground potential. Through a non-reactive resistor $R_1'$, the non-inverting input forms the input to the compensation voltage source Q', which is connected to the output of the band gap BG, and at which the constant reference voltage $U_0$ is produced alternating in time at the clock frequency. Furthermore, the non-inverting input is connected through the non-reactive resistor $R_2'$ to the output of the operational amplifier circuit OP. The output of the differential amplifier DV, at which the output voltage $V_A$ is produced, is fed back through the coupling resistor $R_K$ to the inverting input. An output resistor $R_A$, which is connected to the output of the differential amplifier and is connected through the output capacitor $C_A$ to the reference ground potential, forms the output of the compensation voltage source Q'.

Because, together with the output resistor $R_A$, the output capacitor $C_A$ forms a low-pass filter, the compensation voltage source Q' according to the invention produces a compensation voltage $U_{comp}$ with an exponential time profile. However, depending on the application, it is also possible to choose a circuit configuration at whose output, by way of example, a linear reference voltage $U_{ref}$ or a reference voltage $U_{ref}$ that rises with a power function etc. is produced.

Figure 8:
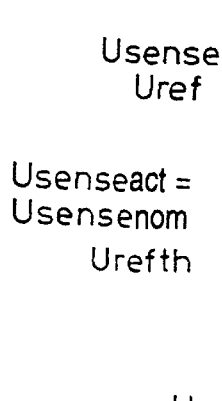
FIG. 8A is a graph illustrating how the power switch according to the invention is switched off when the current in the power switch is rising slowly.
FIG. 8B is a graph illustrating how the power switch according to the invention is switched off when the current in the power switch is rising quickly.
Figure 8:
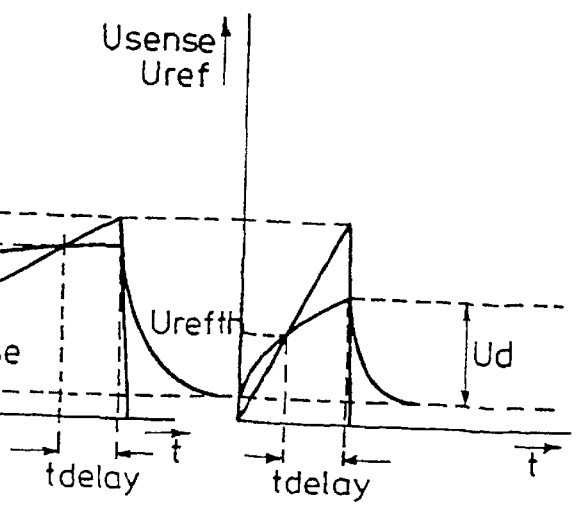

By way of example, FIG. 8 shows the voltage profile of the reference voltage $U_{ref}$ that is produced by the circuit configuration illustrated in FIG. 7. Furthermore, FIG. 8A shows the profile of the current measurement voltage $U_{sense}$ for a low rate of rise $dI_{sense}/dt$ of the (source) current level $I_{sense}$, and FIG. 8B shows the corresponding profile of the current measurement voltage $U_{sense}$ for a high rate of rise $dI_{sense}/dt$ of the (source) current level $I_{sense}$. The intersections of the two voltage profiles $U_{ref}$ and $U_{sense}$ indicate the time at which the signal is produced to switch off the power transistor $T_1'$. The respective intersections are identified by the reference symbol $U_{refth}$. The (source) current level $I_{sense}$ and, hence, the instantaneous current measurement voltage $U_{senseact}$ continue to rise during the total delay time $t_{delay}$ of the signal for switching off by the downstream circuit components, which is independent of the rate of rise $dI_{sense}/dt$ of the (source) current level $I_{sense}$.

In the case of slow rates of rise $dI_{sense}/dt$ of the source current $I_{sense}$, the increase in the source current $I_{delay}$ and, hence, the increase $U_{delay}$ in the current measurement voltage during the total delay time $t_{delay}$ is small while, conversely, when the rates of rise $dI_{sense}/dt$ are high, the (source) current level $I_{sense}$ is large.

To not exceed a maximum permissible nominal current level value $I_{sensenom}$ and, hence, a maximum permissible nominal current measurement voltage value $U_{sensenom}$, the reference voltage value $U_{refth}$ at which the signal to switch off the power transistor $T_1'$ is triggered can be chosen to be lower in the second case shown in FIG. 8B than in the first case shown in FIG. 8A.

This requirement is taken into account by the reference voltage profile $U_{ref}$ illustrated in FIGS. 8A and 8B. In the ideal case:

$$U_{senseact}=U_0+U_{comp}+U_{delay}=\text{constant.} \tag{3}$$

For this situation, the time constants of the circuit, that is to say the delay time (ramp-up time) $\tau_{PLS}$ of the operational amplifier OP after switch-on and the time constant $\tau$ of the output $R_A C_A$ element in the compensation voltage source Q' can be calculated from the following equations:

$$U_0+U_d*(1-\exp(-(t+\tau_{PLS})/\tau)=R_{sense}*dI_{sense}/dt*\tau \tag{4}$$

$$I_{senseact}=dI_{sense}/dt*(t+t_{delay}) \tag{5}$$

For the sake of completeness, it should be mentioned that the MOSFET power transistor $T_1'$ is switched off once the nominal current measurement voltage $U_{sensenom}$ has been reached. The reference voltage $U_{ref}$ decreases back to the initial value $U_0$. The compensation value $U_{comp}$ does not increase again until the next clock cycle.

For high compensation accuracy, the compensation voltage $U_0$ can be trimmed directly on the controller IC.

Figure 9:
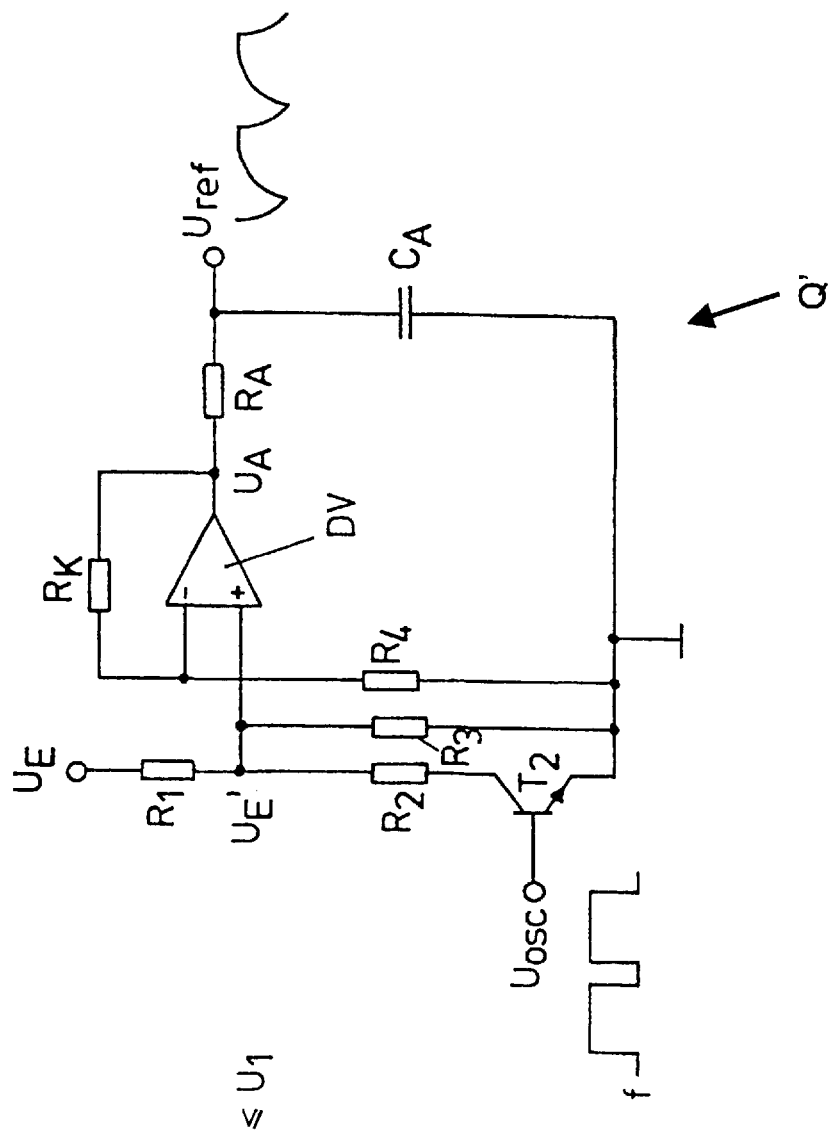
FIG. 9 is a block and schematic circuit diagram of a reference signal source according to the invention.

A further circuit configuration of a compensation signal source Q', according to the invention is illustrated in FIG. 9. The circuit configuration is, once again, based on a differential amplifier DV and corresponding circuitry. The non-inverting input of this differential amplifier DV is connected through a non-reactive resistor $R_3$ to the reference ground potential. Furthermore, the non-inverting input is supplied with a constant input voltage $U_E$ through a non-reactive resistor $R_1$. In addition, the non-inverting input is connected to the reference ground potential GND in time with the clock frequency f of the clock voltage signal through a further non-reactive resistor $R_2$, with the aid of a bipolar transistor $T_2$ that is connected in series with the non-reactive resistor $R_2$ and whose base is driven with the aid of a clock voltage signal $U_{OSC}$. The inverting input of the differential amplifier is connected through a non-reactive resistor $R_4$ to the reference ground potential GND. The output of the differential amplifier DV is fed back to the inverting input through a non-reactive coupling resistor $R_K$. The output voltage $U_A$ is produced at the output of the differential amplifier DV. A reference voltage $U_{ref}$ can be tapped off across a non-reactive output resistor $_{RA}$ that is connected downstream of the output, with the non-reactive output resistor $R_A$ being connected through an output capacitor $C_A$ to the reference ground potential GND.

The compensation voltage source Q' operates with two input voltage $U_E'$. The first input voltage $U_E'$ is the constant reference voltage $U_0$, and the second is the final value $U_1$ (see FIGS. 8A and 8B). $U_1$ is produced with the aid of the voltage divider $R_1$, $R_3$ (see FIG. 9). $U_0$ is produced by using the switched-on transistor $T_2$ to connect the resistor $R_2$ in parallel with the resistor $R_3$.

The circuit, in particular its time response, is configured analogously to the previous example of the circuit configuration shown in FIG. 7.

Figure 10A:
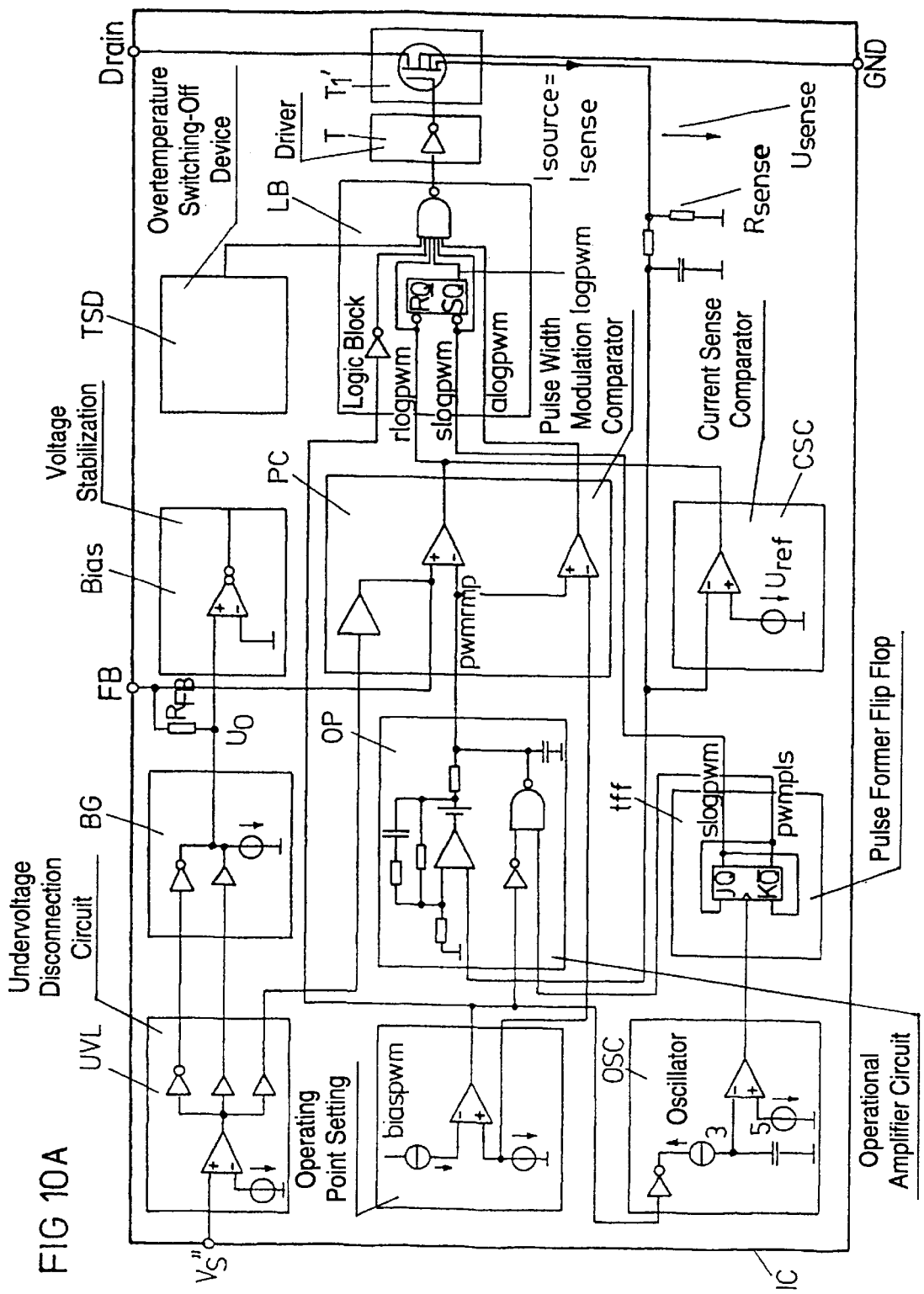
FIG. 10A is a block and schematic circuit diagram of a further embodiment variant of a switch-mode power supply controller according to the invention.
Figure 10B:
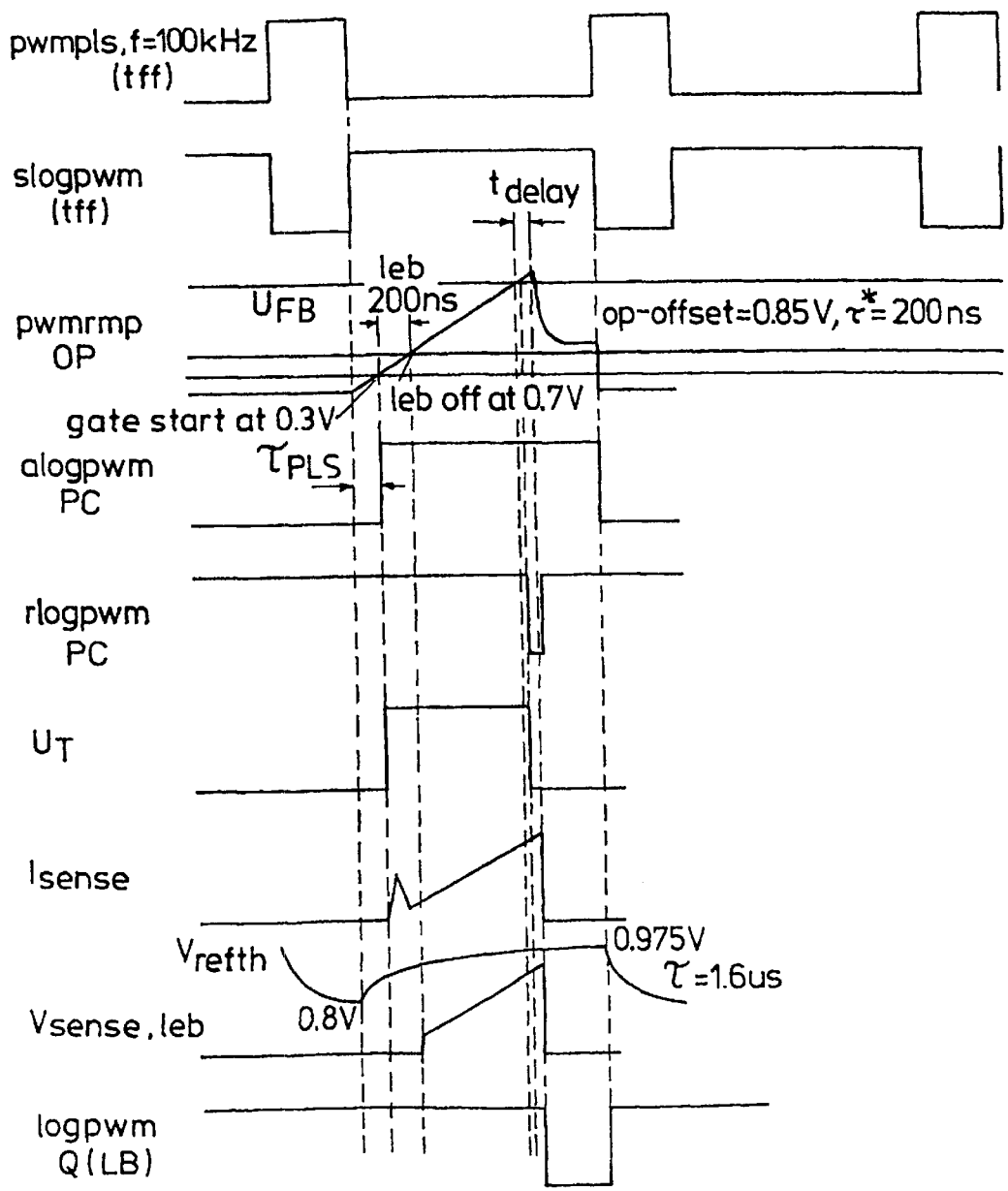
FIG. 10B is a set of timing diagrams of respective associated timings of the internal control signals in the switch-mode power supply controller of FIG. 10A.

FIG. 10A shows a block diagram of a further embodiment variant of a switch-mode power supply controller according to the invention, and FIG. 10B illustrates the associated timings of the internal control signals in this switch-mode power supply controller.

The switch-mode power supply controller IC that is illustrated in FIG. 10A has the major circuit components of the switch-mode power supply controller IC illustrated in FIGS. 5 and 7. The circuit components, which are present in an identical manner, are: the band gap BG, the operational amplifier circuit OP, the pulse width modulation comparator PC, the oscillator OSC, the current sense comparator CSC, the logic block LB, the driver T and the MOS field-effect power transistor $T_1'$ as well as the undervoltage disconnection circuit UVL and the overtemperature switching-off device TSD.

These circuit components are connected to one another as has been disclosed in detail in the description of FIGS. 5 and 7.

In addition, the following circuit components are also shown: a circuit unit for stabilization of the constant reference voltage $U_0$ (bias), a circuit configuration for setting the operating point of the pulse width modulation comparator PC and of the operational amplifier circuit OP (biaspwm), and a pulse former flipflop (tff), which is connected downstream of the oscillator OSC and is based on a JK flipflop.

The output signals from the compensation signal source Q and from the reference signal source Q' are not shown in FIG. 10A. Instead of them, FIG. 10A has symbols for voltage sources to which the reference symbols of the constant reference voltage $U_0$ and of the reference voltage $U_{ref}$ are allocated. Furthermore, the method of operation of the individual circuit elements (UVL, BG, bias, TSD, biaspwm, OP, PC, LB, T, OSC, tff, CSC) is sketched by symbols of electronic components that are interconnected in a corresponding manner. The method of operation of the individual components and their circuitry will not be described in detail in the following text because they are known to a person skilled in the art.

Furthermore, it should be noted that the current measurement resistor $R_{sense}$ is, in the present case, integrated in the switch-mode power supply controller IC according to the invention and is not disposed externally. In the example, an RC element as a low-pass filter is connected downstream of the current measurement resistor $R_{sense}$.

Signal profiles, which are illustrated in functional form, and their associated timings are described in the following text to demonstrate the method of operation of the switch-mode power supply controller IC. FIG. 10A shows the circuit points at which the signals can be tapped off, by identifying them by appropriate reference symbols.

The following signal profiles are illustrated:

pwmpls: signal at the Q output of the pulse former flipflop tff;

slogpwm: signal at the Q output of the pulse former flipflop tff;

pwmrmp: ramp voltage at the output of the operational amplifier circuit OP;

alogpwm: first output signal from the pulse width modulation comparator;

rlogpwm: second output signal from the pulse width modulation comparator;

$U_T$: output signal from the driver T;

$I_{sense}$: current level of the primary current;

$U_{sense, leb}$: current measurement voltage with leading edge blanking (leb); and logpwm: output signal from the RS flipflop in the logic block LB.

The method of operation of the circuit configuration is described in the following text.

pwmpls: the output signal pwmpls is generally used for optimization of the pulse width modulation PWM. The edge gradient of the output signal pwmpls governs the minimum achievable duty cycles. In an ideal situation, duty cycles down to 0% can be achieved. The falling edge of the output signal pwmpls starts an internal ramp voltage, which tends to a final value OP offset of 0.85 V.

alogpwm: the rising edge of the output signal alogpwm switches the MOSFET power transistor $T_1'$ on.

slogpwm: the falling edge of slogpwm positively switches the MOSFET power transistor $T_1'$ off. One pulse of the output signal slogpwm, thus, defines the duration of the duty cycles.

pwmrmp: the ramp voltage pwmrmp is the sum of the internal ramp voltage and the amplified current voltage signal $U_{sense}$. When the ramp voltage pwmrmp reaches a voltage value of 0.3 V (gate start) after the delay time $\tau_{PLS}$, the MOSFET power transistor $T_1'$ is switched on. When the ramp voltage pwmrmp reaches the value of the feedback voltage $U_{FB}$, which is 2.0 V in the example, then the MOSFET power transistor $T_1'$ is switched off. The current sense comparator CSC is switched off for as long as the ramp voltage pwmrmp is in the voltage range between 0.3 and 0.7 V. This is referred to as leading edge blanking (leb). The time duration $\tau^*$ of the leading edge blanking is 200 ms in this example. When the MOSFET power transistor $T_1'$ is in the blocking state, it cannot be switched off. Consequently, disturbance pulses on the current level $I_{sense}$ (see FIG. 10B), which are produced when the MOSFET power transistor $T_1'$ is switched on, are suppressed.

rlogpwm: the falling edge of the output signal rlogpwm resets the RS flipflop in the logic block LB, and switches off the MOSFET transistor $T_1'$.

$U_T$: an output signal that drives the driver stage T is produced from the input signals to the logic block LB, the signals rlogpwm, slogpwm, and alogpwm. The output signal from the driver stage T is a square-waveform signal whose signal duration is governed substantially by the delay time $\tau_{PLS}$ and the time at which the ramp voltage pwmrmp reaches the feedback voltage $U_{FB}$.

It has been found to be disadvantageous for the compensation voltage source Q' as shown in FIGS. 7 and 9 to be suitable only for operation of a switch-mode power supply at one quite specific switching frequency f because this is, then, the only situation in which it is reliably possible to prevent the maximum permissible current through the power switch from being exceeded.

Figure 11:
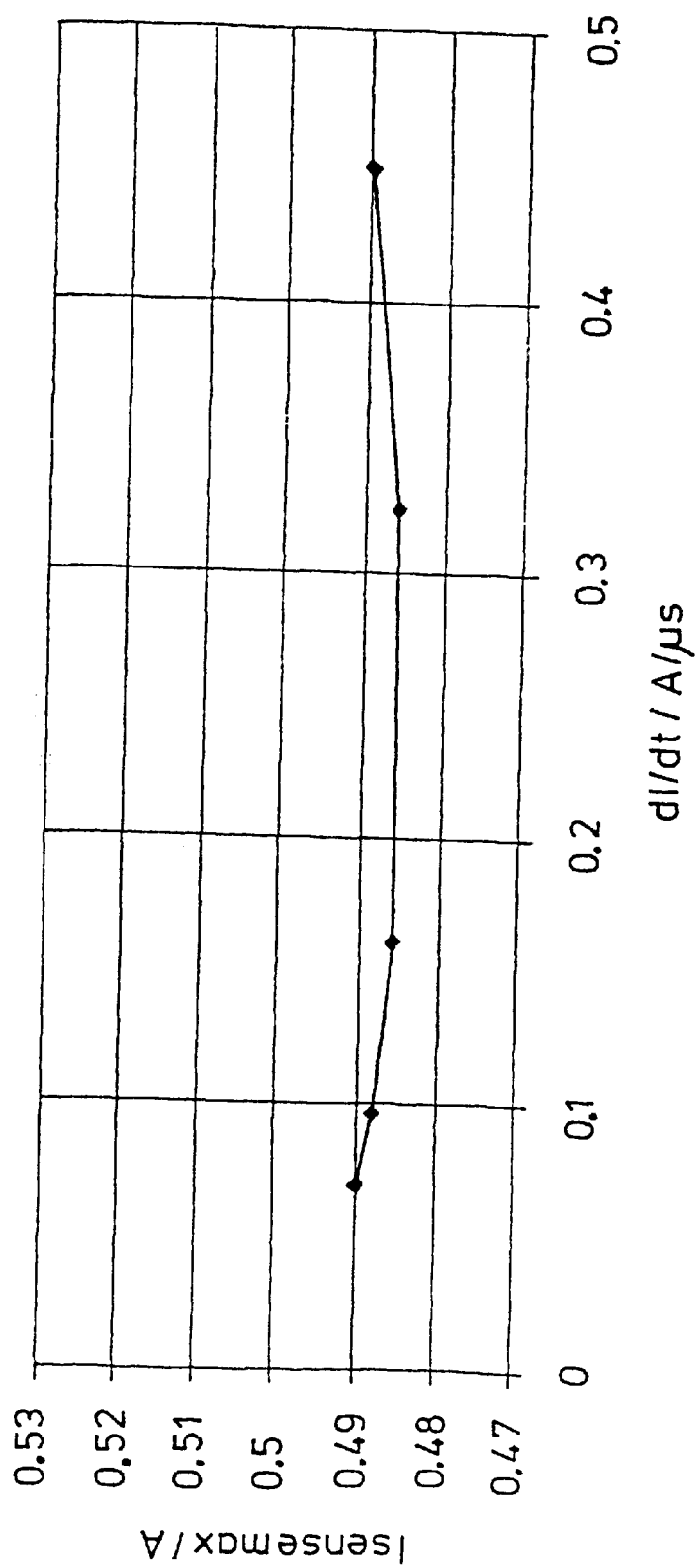
FIG. 11 is a graph illustrating a maximum current level through the power transistor for a different load in the switch-mode power supply controller of FIG. 10A.

FIG. 11 illustrates the maximum current level through the power transistor for a different load in a switch-mode power supply controller according to the invention as shown in FIG. 10 having measurement parameters $R_{sense}$=2.04 Ω and f=91.4 kHz.

The invention provides for the reference voltage profile $V_{ref}$ to be defined such that switching operation of the switch-mode power supply is possible at virtually any desired clock frequency f. For such a purpose, the invention proposes that the circuit configuration of the compensation voltage sources Q' be modified slightly, as is illustrated in FIGS. 7 and 9.

FIGS. 12A, 12B, 13A, and 13B show the way in which a modification is carried out. These figures show the major parts of the reference voltage sources Q as shown in FIGS. 7 and 9, namely those parts in which the compensation voltage is produced. FIG. 12A shows the corresponding detail from the reference signal sources shown in FIGS. 7 and 9, as has already been described in this document above. FIG. 13A shows the same detail, but taking account of the modification according to the invention.

FIG. 12A shows the configuration of the non-reactive output resistor $R_A$ and of the input capacitor $C_A$, which are disposed at the output of the differential amplifier DV that is illustrated in FIGS. 7 and 9.

As has already been seen from FIGS. 7 and 9, the output voltage $U_A$ is produced on the output side of the appropriate differential amplifier DV. This output voltage $U_A$ is, thus, likewise applied to the input of the $R_A C_A$ element. The symbol $U_A$ for this output voltage is also shown in the figures. The reference voltage $U_{ref}$ is produced at the output of the $R_A C_A$ element. The corresponding signal $U_{ref}$ can, likewise, be seen in FIGS. 7, 9, 12A, and 12B.

It can also be seen from FIG. 12A that this voltage signal $U_{ref}$ is passed to the non-inverting input of the current sense comparator, while the current measurement voltage is applied to the inverting input. The output signal from this current sense comparator is passed to the logic block, which is not illustrated in detail here.

Various signal profiles are shown with respect to time underneath the circuit diagram in FIG. 12B. The solid signal profiles correspond to the power switch being clocked at the clock frequency f, while the signal profiles that are represented by dashed lines correspond to clocking of the power transistor at the clock frequency f'.

Output voltage profiles $U_A$, reference voltage profiles $U_{ref}$, and current measurement voltage profiles $U_{sense}$ are now plotted one above the other, with the timings corresponding to one another.

The signal profiles corresponding to the clock frequency f will be considered first of all. In a corresponding way to the square-waveform signal profile of the output voltage $U_A$, the reference voltage $U_{ref}$ has a sawtooth-like profile, as has already been shown in FIG. 8A as described above, namely, an exponential rising profile, when the output voltage $U_A$ assumes a high value, and an exponential decay when the output voltage $U_A$ is at a low value. This is because, as has already been described in detail above, the output capacitor $C_A$ is charged and discharged through the resistor $R_A$.

At the time to, the current through the power switch rises substantially linearly. This is evident from the fact that the current measurement voltage $U_{sense}$, which is directly proportional to the current in the power switch, likewise rises linearly.

This linear rise of the current through the power switch continues until the current sense comparator CSC finds that the reference voltage $U_{ref}$ is of the same magnitude as the current measurement voltage $U_{sense}$. The signal to switch off the power switch is produced at this moment. The corresponding time, when $U_{ref}$ is equal to $U_{sense}$, is identified by the reference symbol $t_1$ in the drawing. The further rise in the current through the power switch and, hence, in the current measurement voltage $U_{sense}$ takes place by virtue of the signal delay time, as has already been described in detail above.

If the entire configuration shown in FIGS. 7, 9, and 12 is now operated with clocking that is different from this (for example, at the clock frequency f'), then this results in a corresponding manner in the voltage profiles $U_A$, $U_{ref}$, and $U_{sense}$ represented by dashed lines. The power switch is, now, switched in a corresponding manner at the time $t_0$'. Starting from a voltage value of $U_0$, the reference voltage $U_{ref}$ rises in accordance with an exponential law. The corresponding rise is identified by the reference symbol $U_{comp}$'. In the same time period, the current through the power switch, and, hence, the current measurement voltage $U_{sense}$, rise linearly. When the reference voltage $U_{ref}$ and the current measurement voltage $U_{sense}$ reach the same value, a signal is produced, as before, to switch off the power transistor. The corresponding time is identified by the reference symbol $t_1$' in the drawing.

As can be seen, the condition $U_{ref}=U_{sense}$ is satisfied only at a relatively high voltage value. This means that the signaling to switch off the power switch is, in this case, produced only when the current through the power switch is at a comparatively high current level. Because the delay resulting from the delay times right at the point at which the power switch is actually switched off is identical to that when operating at the clock frequency f, the power switch is switched off only when the current through the power switch is possibly very much higher than during operation at the clock frequency f. In the worst case, this can lead to destruction of components or of circuit configurations, as has already been described in detail in the introduction herein.

The invention now provides, as shown in FIGS. 13A and 13B, for a switch, for example, in the form of a bipolar transistor $T_S$, to be disposed in parallel with the non-reactive output resistor $R_A$, which switch bridges the output resistor $R_A$ when it is in the closed state so that the current flow is substantially carried through the switch $T_S$ in this situation.

Specifically, this means that the charging process and discharging process of the output capacitor $C_A$ take place with a considerably reduced time constant, and, hence, more quickly.

The invention now provides for the switch $T_S$ to be closed when the output voltage $U_A$ is low, and to be opened when the output voltage $U_A$ is high. This measure means that the reference voltage $U_{ref}$ substantially follows the output voltage $U_A$ when the output voltage $U_A$ is low. When the output voltage $U_A$ is high, the reference voltage $U_{ref}$ is, as in the previous case, obtained as the instantaneous charge voltage of the output capacitor $C_A$ across the non-reactive resistor $R_A$.

FIG. 13B shows the correspondingly modified reference voltage profile $U_{ref}$ as a function of the switch position, in particular, for the switching transistor $T_S$ as described here for the switch signal S. By way of example, the switch is switched by the clock edges of the output voltage signal $U_A$.

As can be seen from FIG. 13B, the magnitude of the reference voltage $U_{ref}$ at the time $t_0$, $t_0$' at which the power switch is switched on is identical for virtually any desired clock frequency f, f'. This is indicated in FIG. 13B by the fact that, in this case, the reference voltage is: $U_{ref}=U_0=U_0$'.

If, as in the present example, the current rise is the same for different clock frequencies f, f', then, the condition $U_{ref} = U_{sense}$ to switch off the power transistor is reached after the same rise duration. Because the delay time between signaling and the time at which the power transistor is switched off is dependent on the clock frequency f, f', switching off occurs with the same current flow through the power transistor in both cases, as can likewise be seen from FIG. 13B.

We claim:

1. A circuit configuration for producing a switching signal for a current-controlled switch-mode power supply having transformer with at least one primary winding and with at least one secondary winding and an input DC voltage, comprising:
    a controlled power switch to be connected to the input DC voltage in series with the at least one primary winding;
    a drive circuit connected to said power switch, said drive circuit switching said power switch on and off clocked in time with a signal having a clock frequency;
    a current measurement device connected to said power switch, said current measurement device measuring a current level through said power switch and producing a measurement signal being a measure of said measured current level;
    a reference signal source producing a reference signal, said reference signal being a constant reference signal independent of time;
    a comparator circuit connected to said drive circuit, to said current measurement device, and to said reference signal source, said comparator circuit comparing said measurement signal with said reference signal and signaling said drive circuit to switch off said power switch when said measurement signal is greater than said reference signal; and
    said reference signal source having an associated compensation signal source producing a compensation signal varying with time, said reference signal being obtained from a sum of said constant reference signal and said compensation signal, said reference signal at a time at which said power switch is switched on having a value less than at a time of said signal at which said power switch is switched off.

2. The circuit configuration according to claim 1, wherein said controlled power switch is a MOS field-effect power transistor.

3. The circuit configuration according to claim 1, wherein said measurement signal is a current measurement voltage.

4. The circuit configuration according to claim 1, wherein said current measurement device is a current measurement resistor.

5. The circuit configuration according to claim 1, wherein said comparator circuit is a current sense comparator.

6. The circuit configuration according to claim 1, wherein:
    said constant reference signal has a reference value;
    once said power switch has been switched on, said reference signal is said reference value; and
    once said power switch has been switched off, said reference signal is a signal falling to said reference value.

7. The circuit configuration according to claim 1, wherein, once said power switch has been switched on, said compensation signal is an exponentially rising signal.

8. The circuit configuration according to claim 1, wherein, once said power switch has been switched on, said compensation signal is a linearly rising signal.

9. The circuit configuration according to claim 1, wherein, once said power switch has been switched on, said compensation signal is a signal rising in accordance with a square law.

10. The circuit configuration according to claim 1, wherein, once said power switch has been switched on, said compensation signal is a signal rising in accordance with a power function.

11. The circuit configuration according to claim 1, wherein:
    said compensation signal has a profile; and
    at least one of said constant reference signal and said profile of the compensation signal is adjustable.

12. The circuit configuration according to claim 1, wherein:
    said compensation signal has a profile; and
    at least one of said constant reference signal and said profile of the compensation signal adjust.

13. The circuit configuration according to claim 1, wherein:
    a first non-reactive resistor is supplied with a constant reference voltage;
    a second non-reactive resistor is supplied with an alternating signal alternating in time with said clock frequency;
    a third non-reactive resistor is connected to a reference ground potential;
    a fourth non-reactive resistor is connected to said reference ground potential;
    said compensation signal source is a differential amplifier having:
        a non-inverting input:
            supplied with said constant reference voltage through said first non-reactive resistor;
            supplied with said alternating signal through said second non-reactive resistor; and
            connected through said third non-reactive resistor to said reference ground potential;
        an inverting input connected to said reference ground potential through said fourth non-reactive resistor; and
        an output producing an output voltage;
    a non-reactive coupling resistor is connected to said inverting input and to said output and feeds said output back to said inverting input;
    a non-reactive output resistor is connected to said output;
    a reference voltage is tapped off across said non-reactive output resistor; and
    an output capacitor connects said non-reactive output resistor to said reference ground potential.

14. The circuit configuration according to claim 13, including a switch connected in parallel with said non-reactive output resistor and, when closed, bridges said non-reactive output resistor, said switch being closed when said output voltage is low and being opened when said output voltage is high.

15. The circuit configuration according to claim 14, wherein said switch is a transistor.

16. The circuit configuration according to claim 15, wherein said switch is opened and closed in time with said power switch.

17. The circuit configuration according to claim 13, including a switch connected in parallel with a compensating resistor and, when closed, bridges said compensating resistor, said switch being closed when said output voltage is low and being opened when said output voltage is high.

18. The circuit configuration according to claim 1, wherein:
    a first non-reactive resistor is supplied with a constant reference voltage;

a second non-reactive resistor is provided;
a third non-reactive resistor is connected to a reference ground potential;
a bipolar transistor is connected in series with said second non-reactive resistor and has a base;
a clock voltage signal is connected to and drives said base;
said compensation signal source is a differential amplifier having:
- a non-inverting input:
  - supplied with said constant reference voltage through said first non-reactive resistor;
  - connected through said third non-reactive resistor to said reference ground potential; and
  - with aid of said bipolar transistor, is connected to said reference-ground potential in time with said clock frequency through said second non-reactive resistor;
- an inverting input; and
- an output producing an output voltage;
a non-reactive output resistor is connected to said inverting input and to said output and feeds said output back to said inverting input;
a reference voltage is tapped off across said non-reactive output resistor; and
an output capacitor connects said non-reactive output resistor to said reference ground potential.

19. The circuit configuration according to claim 18, including a switch connected in parallel with said non-reactive output resistor and, when closed, bridges said non-reactive output resistor, said switch being closed when said output voltage is low and being opened when said output voltage is high.

20. The circuit configuration according to claim 19, wherein said switch is a transistor.

21. The circuit configuration according to claim 20, wherein said switch is opened and closed in time with said power switch.

22. The circuit configuration according to claim 18, including a switch connected in parallel with a compensating resistor and, when closed, bridges said compensating resistor, said switch being closed when said output voltage is low and being opened when said output voltage is high.

23. The circuit configuration according to claim 1, wherein:
said constant reference signal is a constant reference voltage;
a first non-reactive resistor is supplied with said constant reference voltage;
a second non-reactive resistor is supplied with an alternating signal alternating in time with said clock frequency;
a third non-reactive resistor is connected to a reference ground potential;
a fourth non-reactive resistor is connected to said reference ground potential;
said compensation signal source is a differential amplifier having:
- a non-inverting input:
  - supplied with said constant reference voltage through said first non-reactive resistor;
  - supplied with said alternating signal through said second non-reactive resistor; and
  - connected through said third non-reactive resistor to said reference ground potential;
- an inverting input connected to said reference ground potential through said fourth non-reactive resistor; and
- an output producing an output voltage;
a non-reactive coupling resistor is connected to said inverting input and to said output and feeds said output back to said inverting input;
a non-reactive output resistor is connected to said output; said reference signal is a reference voltage tapped off across said non-reactive output resistor; and
an output capacitor connects said non-reactive output resistor to said reference ground potential.

24. The circuit configuration according to claim 1, wherein:
said constant reference signal is a constant reference voltage;
a first non-reactive resistor is supplied with said constant reference voltage;
a second non-reactive resistor is provided;
a third non-reactive resistor is connected to a reference ground potential;
a bipolar transistor is connected in series with said second non-reactive resistor and has a base;
a clock voltage signal is connected to and drives said base;
said compensation signal source is a differential amplifier having:
- a non-inverting input:
  - supplied with said constant reference voltage through said first non-reactive resistor;
  - connected through said third non-reactive resistor to said reference ground potential; and
  - with aid of said bipolar transistor, is connected to said reference-ground potential in time with said clock frequency through said second non-reactive resistor;
- an inverting input; and
- an output producing an output voltage;
a non-reactive output resistor is connected to said inverting input and to said output and feeds said output back to said inverting input;
said reference signal is a reference voltage tapped off across said non-reactive output resistor; and
an output capacitor connects said non-reactive output resistor to said reference ground potential.

25. A switch-mode power supply controller, comprising:
a circuit configuration according to claim 1.

26. The switch-mode power supply controller according to claim 25, wherein the circuit configuration produces the switching signal for a flyback converter.

27. The switch-mode power supply controller according to claim 25, wherein:
said current measurement device is a current measurement resistor; and
said current measurement resistor is external to said circuit configuration.

28. The circuit configuration according to claim 1, wherein the circuit configuration produces the switching signal for a flyback converter.

29. The circuit configuration according to claim 28, wherein the flyback converter is a fixed-frequency flyback converter.

30. The circuit configuration according to claim 28, wherein the flyback converter is a quasi-resonant flyback converter.

31. The circuit configuration according to claim 28, wherein the circuit configuration produces the switching signal for a forward converter.

32. The circuit configuration according to claim 28, wherein the circuit configuration produces the switching signal for a boost converter.

33. A circuit configuration for producing a switching signal for a current-controlled switch-mode power supply, comprising:
- an input DC voltage source providing an input DC voltage;
- a transformer with at least one primary winding and with at least one secondary winding;
- a controlled power switch connected to said input DC voltage source in series with said at least one primary winding;
- a drive circuit connected to said power switch, said drive circuit switching said power switch on and off clocked in time with a signal having a clock frequency;
- a current measurement device connected to said power switch, said current measurement device measuring a current level through said power switch and producing a measurement signal being a measure of said measured current level;
- a reference signal source producing a reference signal, said reference signal being a constant reference signal independent of time;
- a comparator circuit connected to said drive circuit, to said current measurement device, and to said reference signal source, said comparator circuit comparing said measurement signal with said reference signal and signaling said drive circuit to switch off said power switch when said measurement signal is greater than said reference signal; and
- said reference signal source having an associated compensation signal source producing a compensation signal varying with time, said reference signal being obtained from a sum of said constant reference signal and said compensation signal, said reference signal at a time at which said power switch is switched on having a value less than at a time of said signal at which said power switch is switched off.

34. A switch-mode power supply controller, comprising: a circuit configuration according to claim 33.

35. The switch-mode power supply controller according to claim 34, wherein the circuit configuration produces the switching signal for a flyback converter.

36. The circuit configuration according to claim 33, wherein the circuit configuration produces the switching signal for a flyback converter.

* * * * *